(12) United States Patent
Zhang et al.

(10) Patent No.: US 12,114,347 B2
(45) Date of Patent: Oct. 8, 2024

(54) CONTROL INFORMATION SENDING AND RECEIVING METHOD AND APPARATUS

(71) Applicant: HUAWEI TECHNOLOGIES CO., LTD., Guangdong (CN)

(72) Inventors: Xingwei Zhang, Lund (SE); Jinfang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 531 days.

(21) Appl. No.: 17/377,852

(22) Filed: Jul. 16, 2021

(65) Prior Publication Data

US 2021/0345364 A1 Nov. 4, 2021

Related U.S. Application Data

(63) Continuation of application No. PCT/CN2020/071374, filed on Jan. 10, 2020.

(30) Foreign Application Priority Data

Feb. 3, 2019 (CN) .......................... 201910109068.6

(51) Int. Cl.
*H04W 72/566* (2023.01)
*H04L 1/1812* (2023.01)
(Continued)

(52) U.S. Cl.
CPC ......... *H04W 72/569* (2023.01); *H04L 1/1812* (2013.01); *H04W 72/20* (2023.01); *H04W 72/56* (2023.01)

(58) Field of Classification Search
CPC ... H04W 72/569; H04W 72/20; H04W 72/56; H04W 4/40; H04W 52/0216; H04W 4/06;
(Continued)

(56) References Cited

U.S. PATENT DOCUMENTS

| 2014/0023009 A1 | 1/2014 | Abe et al. |
| 2015/0049740 A1 | 2/2015 | Lee et al. |

(Continued)

FOREIGN PATENT DOCUMENTS

| CN | 101933284 A | 12/2010 |
| CN | 102281133 A | 12/2011 |

(Continued)

OTHER PUBLICATIONS

Office Action issued in Japanese Application No. 2021-542474 on Aug. 30, 2022, 13 pages (with English translation).

(Continued)

*Primary Examiner* — Kwang B Yao
*Assistant Examiner* — Syed M Bokhari
(74) *Attorney, Agent, or Firm* — Fish & Richardson P.C.

(57) ABSTRACT

This application provides a control information sending method, including determining L pieces of control information from M pieces of control information based on a priority rule, where the M pieces of control information include M1 pieces of uplink control information and M2 pieces of sidelink control information, types of M1 pieces of uplink control information include a hybrid automatic repeat request, a scheduling request, and channel state information, types of M2 pieces of sidelink control information include a sidelink hybrid automatic repeat request, a sidelink scheduling request, and sidelink channel state information, M is a positive integer greater than or equal to 2, M1 is an integer greater than or equal to 0, M2 is an integer greater than or equal to 1, and L is an integer greater than or equal to 0 and less than or equal to M, and sending the L pieces of control information.

18 Claims, 5 Drawing Sheets

(51) Int. Cl.
*H04W 72/20* (2023.01)
*H04W 72/56* (2023.01)

(58) Field of Classification Search
CPC ............ H04W 52/0219; H04L 1/1812; H04L 1/1854; H04L 1/1671; H04L 5/0048; H04L 1/0026; H04L 5/0053; H04L 5/0055; H04L 5/0057; Y02D 30/70
USPC ........................................................ 370/329
See application file for complete search history.

(56) References Cited

U.S. PATENT DOCUMENTS

| | | | |
|---|---|---|---|
| 2015/0078279 A1 | 3/2015 | Ko et al. | |
| 2015/0365925 A1 | 12/2015 | Fu et al. | |
| 2016/0044653 A1 | 2/2016 | Bagheri et al. | |
| 2016/0192386 A1* | 6/2016 | Kim | H04W 72/0453 370/329 |
| 2016/0255670 A1 | 9/2016 | Lee et al. | |
| 2019/0190655 A1* | 6/2019 | Pan | H04L 1/0057 |
| 2020/0163155 A1* | 5/2020 | Lee | H04W 72/23 |
| 2020/0359375 A1* | 11/2020 | Hwang | H04L 1/1854 |
| 2020/0404684 A1* | 12/2020 | Lee | H04L 1/1896 |

FOREIGN PATENT DOCUMENTS

| | | | |
|---|---|---|---|
| CN | 104935415 A | 9/2015 | |
| EP | 2597799 A2 | 5/2013 | |
| EP | 2768262 A1 | 8/2014 | |
| EP | 3206321 A1 | 8/2017 | |
| JP | 2011514727 A | 5/2011 | |
| WO | 2016019850 A1 | 2/2016 | |
| WO | 2018203669 A1 | 11/2018 | |
| WO | 2020033719 A1 | 2/2020 | |
| WO | 2020136853 A1 | 7/2020 | |

OTHER PUBLICATIONS

OPPO, "UL/SL Prioritization in eV2x," 3GPP TSG RAN WG2 #103, R2-1811092, Gothenburg, Sweden, Aug. 20-24, 2018, 4 pages.
Extended European Search Report issued in European Application No. 20748952.7 on Jan. 21, 2022, 10 pages.
Fraunhofer HHI et al., Physical Layer Procedures for Unicast and Groupcast, 3GPP TSG RAN WG1 Meeting #95, R1-1812401, Spokane, USA, Nov. 12-16, 2018, 8 pages.
Huawei et al., "Potential RAN2 impacts on gNB scheduled resource allocation for Nr V2X," 3GPP TSG-RAN WG2 #104, R2-1816518, Spokane, USA, Nov. 12-16, 2018, 5 pages.
LG Electronics Inc et al., "UL and SL prioritization in TS 36.321-alt2," 3GPP TSG-RAN WG2 #104, R2-1818718, Spokane, USA, Nov. 12-16, 2018, 6 pages.
Office Action issued in Chinese Application No. 201910109068.6 on Jan. 26, 2021, 17 pages (with English translation).
Office Action issued in Chinese Application No. 201910109068.6 on May 24, 2021, 22 pages (with English translation).
PCT International Search Report and Written Opinion issued in International Application No. PCT/CN2020/071374 on Mar. 27, 2020, 13 pages (with English translation).
Samsung, "Coexistence of PC5-based V2V operation and legacy Uu operation," 3GPP TSG RAN WG1 #86bis, R1-1608993, Lisbon, Portugal, Oct. 10-14, 2016, 3 pages.
Samsung, "Discussion on Coexistence between LTE and NR PC5," 3GPP TSG RAN WG1 Meeting #95, R1-1812991, Spokane, USA, Nov. 12-16, 2018, 3 pages.

* cited by examiner

CONTROL INFORMATION SENDING AND RECEIVING METHOD AND APPARATUS

CROSS-REFERENCE TO RELATED APPLICATIONS

This application is a continuation of International Application No. PCT/CN2020/071374, filed on Jan. 10, 2020, which claims priority to Chinese Patent Application No. 201910109068.6, filed on Feb. 3, 2019. The disclosures of the aforementioned applications are hereby incorporated by reference in their entireties.

TECHNICAL FIELD

This application relates to the communications field, and more specifically, to a control information sending and receiving method and an apparatus.

BACKGROUND

In systems such as a device-to-device (D2D) system and a vehicle-to-everything (V2X) system, a link used for direct communication between different terminal apparatuses may be referred to as a sidelink (SL), and communication between terminals is performed in a broadcast manner. A transmit end terminal sends a physical sidelink control channel (PSCCH) and a physical sidelink shared channel (PSSCH), and a receive end terminal may send a sidelink hybrid automatic repeat request-acknowledgment (SL HARQ-ACK) or a sidelink hybrid automatic repeat request-negative acknowledgment (SL HARQ-NACK) to the transmit end terminal or a network apparatus, to notify the transmit end terminal or the network apparatus whether the PSCCH or the PSSCH is correctly received. The receive end terminal may further feed back sidelink channel state information (SL CSI) that is of a sidelink and that is obtained through measurement to the transmit end terminal or the network apparatus. When a terminal apparatus needs to send a plurality of pieces of sidelink control information on a sidelink, or needs to send a plurality of pieces of uplink control information and sidelink control information on an uplink, overheads of the control information are likely to exceed a channel capacity.

SUMMARY

This application provides a control information sending method, to provide a method for sending and receiving control information.

According to a first aspect, a control information sending method is provided. The method includes:
a terminal apparatus determines L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M; and the terminal apparatus sends the L pieces of control information.

The terminal apparatus sends control information with a relatively high priority based on the priority rule, so that the terminal apparatus does not miss control information with a high priority. The terminal may exclude low-priority control information based on the priority rule, thereby reducing energy consumption for sending messages by the terminal apparatus. A quantity of resources that can be used by the terminal is limited, and sending more important control information on a channel can improve resource utilization.

In a possible implementation of the first aspect, the priority rule is used to determine at least one of a priority rule for at least two types of control information, a priority rule for control information corresponding to at least two communication modes, and a priority rule for control information corresponding to at least two attributes.

The priority rule may indicate priorities of at least two pieces of control information from one or more perspectives, and provides a plurality of manners for the terminal apparatus to determine the priorities of the control information.

In a possible implementation of the first aspect, the priority rule for at least two types of control information includes at least one of the following priority rules: A priority of a sidelink hybrid automatic repeat request is higher than a priority of sidelink channel state information; a priority of a sidelink scheduling request is higher than a priority of sidelink channel state information; a priority of sidelink aperiodic channel state information is higher than a priority of sidelink semi-persistent channel state information; a priority of sidelink aperiodic channel state information is higher than a priority of sidelink periodic channel state information; a priority of sidelink semi-persistent channel state information is higher than a priority of sidelink periodic channel state information; a priority of sidelink beam related channel state information is higher than a priority of sidelink non-beam related channel state information; a priority of sidelink rank related channel state information is higher than a priority of sidelink non-rank related channel state information; a priority of sidelink wideband channel state information is higher than a priority of sidelink sub-band channel state information; and a priority of uplink control information is higher than a priority of sidelink control information.

The priority rule provides priorities of a plurality of different types of control information, so as to resolve a problem that control information with different priorities cannot be simultaneously sent in a case in which resources carrying the control information with different priorities overlap in time domain, and ensure sending of control information with a high priority.

In a possible implementation of the first aspect, that a priority of uplink control information is higher than a priority of sidelink control information includes at least one of the following priority rules: A priority of a hybrid automatic repeat request is higher than a priority of a sidelink hybrid automatic repeat request; a priority of a scheduling request is higher than a priority of a sidelink scheduling request; a priority of channel state information is higher than a priority of sidelink channel state information; a priority of aperiodic channel state information is higher than a priority of sidelink aperiodic channel state information; a priority of semi-persistent channel state information is higher than a priority of sidelink semi-persistent channel state information; a priority of periodic channel state information is higher than a priority of sidelink periodic channel state information; a priority of beam related channel state information is higher than a priority of sidelink beam related channel state information; a priority of non-beam related channel state information is higher than a priority of sidelink non-beam related channel state information; a priority of rank related channel state information is higher than a priority of sidelink rank related channel state information; a priority of non-rank related channel state information is higher than a priority of sidelink non-rank related channel state information; a priority of wideband channel state information is higher than a priority of sidelink wideband channel state information; and a priority of sub-band channel state information is higher than a priority of sidelink sub-band channel state information.

The priority rule provides priorities of a plurality of different types of control information, so as to resolve a problem that control information with different priorities cannot be simultaneously sent in a case in which resources carrying the control information with different priorities overlap in time domain, and ensure sending of control information with a high priority.

In a possible implementation of the first aspect, the priority rule for control information corresponding to at least two communication modes includes at least one of the following priority rules: A priority of sidelink feedback information corresponding to a sidelink whose communication mode is broadcast is higher than a priority of sidelink feedback information corresponding to a sidelink whose communication mode is multicast; a priority of sidelink feedback information corresponding to a sidelink whose communication mode is broadcast is higher than a priority of sidelink feedback information corresponding to a sidelink whose communication mode is unicast; and a priority of sidelink feedback information corresponding to a sidelink whose communication mode is multicast is higher than a priority of sidelink feedback information corresponding to a sidelink whose communication mode is unicast.

The priority rule provides priorities of control information corresponding to a plurality of different communication modes, so as to resolve a problem that control information with different priorities cannot be simultaneously sent in a case in which resources carrying the control information with different priorities overlap in time domain, and ensure sending of control information with a high priority.

In a possible implementation of the first aspect, the priority rule for control information corresponding to at least two communication modes includes at least one of the following priority rules: A priority of sidelink feedback information corresponding to a sidelink whose communication mode is broadcast is lower than a priority of sidelink feedback information corresponding to a sidelink whose communication mode is multicast; a priority of sidelink feedback information corresponding to a sidelink whose communication mode is broadcast is lower than a priority of sidelink feedback information corresponding to a sidelink whose communication mode is unicast; and a priority of sidelink feedback information corresponding to a sidelink whose communication mode is multicast is lower than a priority of sidelink feedback information corresponding to a sidelink whose communication mode is unicast.

The priority rule provides priorities of control information corresponding to a plurality of different communication modes, so as to resolve a problem that control information with different priorities cannot be simultaneously sent in a case in which resources carrying the control information with different priorities overlap in time domain, and ensure sending of control information with a high priority.

In a possible implementation of the first aspect, the priority rule for control information corresponding to at least two attributes includes at least one of the following priority rules: A priority of sidelink feedback information corresponding to a cell with a smaller cell number is higher than a priority of sidelink feedback information corresponding to a cell with a larger cell number; a priority of sidelink feedback information corresponding to a smaller channel state information configuration identifier is higher than a priority of sidelink feedback information corresponding to a larger channel state information configuration identifier; and a priority of control information corresponding to a smaller sending link number is higher than a priority of control information corresponding to a larger sending link number.

The priority rule provides priorities of control information corresponding to a plurality of different attributes, so as to resolve a problem that control information with different priorities cannot be simultaneously sent in a case in which resources carrying the control information with different priorities overlap in time domain, and ensure sending of control information with a high priority.

In a possible implementation of the first aspect, the priority rule for control information corresponding to at least two attributes includes at least one of the following priority rules: A priority of sidelink feedback information corresponding to a cell with a larger cell number is higher than a priority of sidelink feedback information corresponding to a cell with a smaller cell number; a priority of sidelink feedback information corresponding to a larger channel state information configuration identifier is higher than a priority of sidelink feedback information corresponding to a smaller channel state information configuration identifier; and a priority of control information corresponding to a larger sending link number is higher than a priority of control information corresponding to a smaller sending link number.

The priority rule provides priorities of control information corresponding to a plurality of different attributes, so as to resolve a problem that control information with different priorities cannot be simultaneously sent in a case in which resources carrying the control information with different priorities overlap in time domain, and ensure sending of control information with a high priority.

In a possible implementation of the first aspect, the determining L pieces of control information from M pieces of control information based on a priority rule includes: determining a priority sequence of the M pieces of control information based on the priority rule; and determining the L pieces of control information based on the priority sequence of the M pieces of control information.

The terminal apparatus may determine the priority sequence of the M pieces of control information based on the priority rule. The terminal apparatus may determine the L pieces of control information by comparing priority sequence numbers of the M pieces of control information. A calculation amount required by the terminal apparatus to determine the L pieces of control information is relatively small, and therefore, energy consumption required by the terminal apparatus to determine the L pieces of control information is reduced.

In a possible implementation of the first aspect, the priority rule indicates a priority rule for S pieces of control information corresponding to at least two types, at least two communication modes, and/or at least two attributes, priorities of S1 pieces of control information in the S pieces of control information are higher than priorities of S−S1 pieces of control information other than the S1 pieces of control information in the S pieces of control information, S1 is a positive integer greater than or equal to 1 and less than or equal to S, and S is a positive integer greater than or equal to 2. The determining L pieces of control information from M pieces of control information based on a priority rule includes: determining the L pieces of control information with highest priorities in the M pieces of control information based on a priority rule for the S1 pieces of control information.

The terminal apparatus may determine the L pieces of control information by determining whether the M pieces of control information include high-priority control information. The terminal apparatus does not need to determine priorities of control information other than the L pieces of control information in the M pieces of control information, so that an amount of data that needs to be processed by the terminal apparatus is reduced, and energy consumption required by the terminal apparatus to determine the L pieces of control information is reduced.

In a possible implementation of the first aspect, priorities of the L pieces of control information are higher than priorities of M−L pieces of control information other than the L pieces of control information in the M pieces of control information.

In a possible implementation of the first aspect, the determining L pieces of control information from M pieces of control information based on a priority rule includes: determining the L pieces of control information from the M pieces of control information based on the priority rule and a channel capacity, where a total quantity of bits of the L pieces of control information is less than or equal to the channel capacity.

The terminal apparatus may determine the L pieces of control information based on the channel capacity, thereby improving flexibility of determining the L pieces of control information. In addition, it is ensured that the channel capacity is sufficient to transmit the L pieces of control information, thereby improving transmission accuracy of the L pieces of control information.

In a possible implementation of the first aspect, before the determining the L pieces of control information from the M pieces of control information based on the priority rule and a channel capacity, the method further includes: The terminal apparatus determines the channel capacity.

In a possible implementation of the first aspect, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

Total overheads of the L pieces of control information with highest priorities in the M pieces of control information are less than the channel capacity, and total overheads of L+1 pieces of control information with highest priorities in the M pieces of control information are greater than the channel capacity. Sending the L pieces of control information can ensure sending of control information with a high priority, and further improve channel utilization.

In a possible implementation of the first aspect, less than L pieces of control information may be sent. Although the channel capacity is not fully used, less information is transmitted by using more resources, so that a lower-order modulation scheme and/or a lower bit rate can be used to improve an information transmission success rate.

In a possible implementation of the first aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: determining a priority sequence of the M pieces of control information based on the N1 priority sub-rules; and determining the L pieces of control information from the M pieces of control information based on the priority sequence of the M pieces of control information.

The terminal apparatus may determine the L pieces of control information based on some sub-rules with relatively high priorities in the priority rule, so that a quantity of determining times of the terminal apparatus is reduced, priorities of the control information are more accurate, and a calculation amount required by the terminal apparatus for determining the L pieces of control information is reduced, and therefore, energy consumption required by the terminal apparatus to determine the L pieces of control information is reduced.

In a possible implementation of the first aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: determining a priority sequence of the M pieces of control information first based on the N1 priority sub-rules and then based on the N−N1 priority sub-rules; and determining the L pieces of control information from the M pieces of control information based on the priority sequence of the M pieces of control information.

The terminal apparatus may first determine a priority sequence of the M pieces of control information based on some sub-rules with relatively high priorities in the priority rule, where the M pieces of control information may include some pieces of control information whose priorities are the same and cannot be distinguished. Then, the priority sequence of the M pieces of control information is determined based on some sub-rules whose priorities are relatively low in the priority rule, so that accuracy of the priority sequence of the control information can be improved.

In a possible implementation of the first aspect, that the terminal apparatus sends the L pieces of control information includes: The terminal apparatus sends the L pieces of control information on at least one of a physical sidelink feedback channel, a physical sidelink control channel, a physical sidelink shared channel, a physical uplink control channel, or a physical uplink shared channel.

According to a second aspect, a control information receiving method is provided. The method includes:

a network apparatus determines L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M; and the network apparatus receives the L pieces of control information.

A terminal apparatus sends control information with a relatively high priority based on the priority rule, so that the terminal apparatus does not miss control information with a high priority. The terminal apparatus may exclude low-priority control information based on the priority rule, thereby reducing energy consumption for sending messages by the terminal apparatus. A quantity of resources that can be used by the terminal apparatus is limited, and sending more important control information on a channel can improve resource utilization. Correspondingly, the receive end network apparatus may determine, based on the priority rule, the control information sent by the terminal apparatus.

In a possible implementation of the second aspect, the priority rule is used to determine at least one of a priority rule for at least two types of control information, a priority rule for control information corresponding to at least two communication modes, and a priority rule for control information corresponding to at least two attributes.

The priority rule may indicate priorities of at least two pieces of control information from one or more perspectives, and provides a plurality of manners for the network apparatus to determine the priorities of the control information.

In a possible implementation of the second aspect, the priority rule for at least two types of control information includes at least one of the following priority rules: A priority of a sidelink hybrid automatic repeat request is higher than a priority of sidelink channel state information; a priority of a sidelink scheduling request is higher than a priority of sidelink channel state information; a priority of sidelink aperiodic channel state information is higher than a priority of sidelink semi-persistent channel state information; a priority of sidelink aperiodic channel state information is higher than a priority of sidelink periodic channel state information; a priority of sidelink semi-persistent channel state information is higher than a priority of sidelink periodic channel state information; a priority of sidelink beam related channel state information is higher than a priority of sidelink non-beam related channel state information; a priority of sidelink rank related channel state information is higher than a priority of sidelink non-rank related channel state information; a priority of sidelink wideband channel state information is higher than a priority of sidelink sub-band channel state information; and a priority of uplink control information is higher than a priority of sidelink control information.

The priority rule provides priorities of a plurality of different types of control information, so as to resolve a problem that control information with different priorities cannot be simultaneously sent in a case in which resources carrying the control information with different priorities overlap in time domain, and ensure sending of control information with a high priority.

In a possible implementation of the second aspect, that a priority of uplink control information is higher than a priority of sidelink control information includes at least one of the following priority rules: A priority of a hybrid automatic repeat request is higher than a priority of a sidelink hybrid automatic repeat request; a priority of a scheduling request is higher than a priority of a sidelink scheduling request; a priority of channel state information is higher than a priority of sidelink channel state information; a priority of aperiodic channel state information is higher than a priority of sidelink aperiodic channel state information; a priority of semi-persistent channel state information is higher than a priority of sidelink semi-persistent channel state information; a priority of periodic channel state information is higher than a priority of sidelink periodic channel state information; a priority of beam related channel state information is higher than a priority of sidelink beam related channel state information; a priority of non-beam related channel state information is higher than a priority of sidelink non-beam related channel state information; a priority of rank related channel state information is higher than a priority of sidelink rank related channel state information; a priority of non-rank related channel state information is higher than a priority of sidelink non-rank related channel state information; a priority of wideband channel state information is higher than a priority of sidelink wideband channel state information; and a priority of sub-band channel state information is higher than a priority of sidelink sub-band channel state information.

The priority rule provides priorities of a plurality of different types of control information, so as to resolve a problem that control information with different priorities cannot be simultaneously sent in a case in which resources carrying the control information with different priorities overlap in time domain, and ensure sending of control information with a high priority.

In a possible implementation of the second aspect, the priority rule for control information corresponding to at least two communication modes includes at least one of the following priority rules: A priority of sidelink feedback information corresponding to a sidelink whose communication mode is broadcast is higher than a priority of sidelink feedback information corresponding to a sidelink whose communication mode is multicast; a priority of sidelink feedback information corresponding to a sidelink whose communication mode is broadcast is higher than a priority of sidelink feedback information corresponding to a sidelink whose communication mode is unicast; and a priority of sidelink feedback information corresponding to a sidelink whose communication mode is multicast is higher than a priority of sidelink feedback information corresponding to a sidelink whose communication mode is unicast.

The priority rule provides priorities of control information corresponding to a plurality of different communication modes, so as to resolve a problem that control information with different priorities cannot be simultaneously sent in a case in which resources carrying the control information with different priorities overlap in time domain, and ensure sending of control information with a high priority.

In a possible implementation of the second aspect, the priority rule for control information corresponding to at least two communication modes includes at least one of the following priority rules: A priority of sidelink feedback information corresponding to a sidelink whose communication mode is broadcast is lower than a priority of sidelink feedback information corresponding to a sidelink whose communication mode is multicast; a priority of sidelink feedback information corresponding to a sidelink whose communication mode is broadcast is lower than a priority of sidelink feedback information corresponding to a sidelink whose communication mode is unicast; and a priority of sidelink feedback information corresponding to a sidelink whose communication mode is multicast is lower than a priority of sidelink feedback information corresponding to a sidelink whose communication mode is unicast.

The priority rule provides priorities of control information corresponding to a plurality of different communication modes, so as to resolve a problem that control information with different priorities cannot be simultaneously sent in a case in which resources carrying the control information with different priorities overlap in time domain, and ensure sending of control information with a high priority. In a possible implementation of the second aspect, the priority rule for control information corresponding to at least two attributes includes at least one of the following priority rules: A priority of sidelink feedback information corresponding to a cell with a smaller cell number is higher than a priority of sidelink feedback information corresponding to a cell with a larger cell number; a priority of sidelink feedback information corresponding to a smaller channel state information configuration identifier is higher than a priority of sidelink feedback information corresponding to a larger channel state information configuration identifier; and a priority of control information corresponding to a smaller sending link number is higher than a priority of control information corresponding to a larger sending link number.

The priority rule provides priorities of control information corresponding to a plurality of different attributes, so as to resolve a problem that control information with different priorities cannot be simultaneously sent in a case in which resources carrying the control information with different priorities overlap in time domain, and ensure sending of control information with a high priority.

In a possible implementation of the second aspect, the priority rule for control information corresponding to at least two attributes includes at least one of the following priority rules: A priority of sidelink feedback information corresponding to a cell with a larger cell number is higher than a priority of sidelink feedback information corresponding to a cell with a smaller cell number; a priority of sidelink feedback information corresponding to a larger channel state information configuration identifier is higher than a priority of sidelink feedback information corresponding to a smaller channel state information configuration identifier; and a priority of control information corresponding to a larger sending link number is higher than a priority of control information corresponding to a smaller sending link number.

The priority rule provides priorities of control information corresponding to a plurality of different attributes, so as to resolve a problem that control information with different priorities cannot be simultaneously sent in a case in which resources carrying the control information with different priorities overlap in time domain, and ensure sending of control information with a high priority. In a possible implementation of the second aspect, the determining L pieces of control information from M pieces of control information based on a priority rule includes: determining a priority sequence of the M pieces of control information based on the priority rule; and determining the L pieces of control information based on the priority sequence of the M pieces of control information.

The network apparatus may determine the priority sequence of the M pieces of control information based on the priority rule. The network apparatus may determine the L pieces of control information by comparing priority sequence numbers of the M pieces of control information. A calculation amount required by the network apparatus to determine the L pieces of control information is relatively small, and therefore, energy consumption required by the network apparatus to determine the L pieces of control information is reduced.

In a possible implementation of the second aspect, the priority rule indicates a priority rule for S pieces of control information corresponding to at least two types, at least two communication modes, and/or at least two attributes, priorities of S1 pieces of control information in the S pieces of control information are higher than priorities of S−S1 pieces of control information other than the S1 pieces of control information in the S pieces of control information, S1 is a positive integer greater than or equal to 1 and less than or equal to S, and S is a positive integer greater than or equal to 2. The determining L pieces of control information from M pieces of control information based on a priority rule includes: determining the L pieces of control information with highest priorities in the M pieces of control information based on a priority sequence of the S1 pieces of control information.

The network apparatus may determine the L pieces of control information by determining whether the M pieces of control information include high-priority control information. The network apparatus does not need to determine priorities of control information other than the L pieces of control information in the M pieces of control information, so that an amount of data that needs to be processed by the network apparatus is reduced, and energy consumption required by the network apparatus to determine the L pieces of control information is reduced.

In a possible implementation of the second aspect, priorities of the L pieces of control information are higher than priorities of M−L pieces of control information other than the L pieces of control information in the M pieces of control information.

In a possible implementation of the second aspect, the determining L pieces of control information from M pieces of control information based on a priority rule includes: determining the L pieces of control information from the M pieces of control information based on the priority rule and a channel capacity, where a total quantity of bits of the L pieces of control information is less than or equal to the channel capacity.

The network apparatus may determine the L pieces of control information based on the channel capacity, thereby improving flexibility of determining the L pieces of control information. In addition, it is ensured that the channel capacity is sufficient to transmit the L pieces of control information, thereby improving transmission accuracy of the L pieces of control information.

In a possible implementation of the second aspect, before the determining the L pieces of control information from the M pieces of control information based on the priority rule and a channel capacity, the method further includes: The network apparatus determines the channel capacity.

In a possible implementation of the second aspect, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

Total overheads of the L pieces of control information with highest priorities in the M pieces of control information are less than the channel capacity, and total overheads of L+1 pieces of control information with highest priorities in the M pieces of control information are greater than the channel capacity. Sending the L pieces of control information can ensure sending of control information with a high priority, and further improve channel utilization.

In a possible implementation of the second aspect, less than L pieces of control information may be sent. Although the channel capacity is not fully used, less information is transmitted by using more resources, so that a lower-order modulation scheme and/or a lower bit rate can be used to improve an information transmission success rate.

In a possible implementation of the second aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: The network apparatus determines a priority sequence of the M pieces of control information based on the N1 priority sub-rules; and determines the L pieces of control information from the M pieces of control information based on the priority sequence of the M pieces of control information.

The network apparatus may determine the L pieces of control information based on some sub-rules with relatively high priorities in the priority rule, so that a quantity of determining times of the network apparatus is reduced, priorities of the control information are more accurate, and a calculation amount required by the network apparatus for determining the L pieces of control information is reduced, and therefore, energy consumption required by the network apparatus to determine the L pieces of control information is reduced.

In a possible implementation of the second aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2.

The determining L pieces of control information from M pieces of control information based on a priority rule includes:
  determining a priority sequence of the M pieces of control information first based on the N1 priority sub-rules and then based on the N−N1 priority sub-rules; and
  determining the L pieces of control information from the M pieces of control information based on the priority sequence of the M pieces of control information.

The network apparatus may first determine a priority sequence of the M pieces of control information based on some sub-rules with relatively high priorities in the priority rule, where the M pieces of control information may include some pieces of control information whose priorities are the same and cannot be distinguished. Then, the priority sequence of the M pieces of control information is determined based on some sub-rules whose priorities are relatively low in the priority rule, so that accuracy of the priority sequence of the control information can be improved.

In a possible implementation of the second aspect, that the network apparatus receives the L pieces of control information includes: The network apparatus receives the L pieces of control information on at least one of a physical sidelink feedback channel, a physical sidelink control channel, a physical sidelink shared channel, a physical uplink control channel, or a physical uplink shared channel.

According to a third aspect, a control information receiving method is provided. The method includes:
  a terminal apparatus determines L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M; and the terminal apparatus receives the L pieces of control information.

A terminal apparatus sends control information with a relatively high priority based on the priority rule, so that the terminal apparatus does not miss control information with a high priority. The terminal apparatus may exclude low-priority control information based on the priority rule, thereby reducing energy consumption for sending messages by the terminal apparatus. A quantity of resources that can be used by the terminal apparatus is limited, and sending more important control information on a channel can improve resource utilization. Correspondingly, the receive end terminal apparatus may determine, based on the priority rule, the control information sent by the terminal apparatus.

In a possible implementation of the third aspect, the priority rule is used to determine at least one of a priority rule for at least two types of control information, a priority rule for control information corresponding to at least two communication modes, and a priority rule for control information corresponding to at least two attributes.

The priority rule may indicate priorities of at least two pieces of control information from one or more perspectives, and provides a plurality of manners for the terminal apparatus to determine the priorities of the control information.

In a possible implementation of the third aspect, the priority rule for at least two types of control information includes at least one of the following priority rules: A priority of a sidelink hybrid automatic repeat request is higher than a priority of sidelink channel state information; a priority of a sidelink scheduling request is higher than a priority of sidelink channel state information; a priority of sidelink aperiodic channel state information is higher than a priority of sidelink semi-persistent channel state information; a priority of sidelink aperiodic channel state information is higher than a priority of sidelink periodic channel state information; a priority of sidelink semi-persistent channel state information is higher than a priority of sidelink periodic channel state information; a priority of sidelink beam related channel state information is higher than a priority of sidelink non-beam related channel state information; a priority of sidelink rank related channel state information is higher than a priority of sidelink non-rank related channel state information; a priority of sidelink wideband channel state information is higher than a priority of sidelink sub-band channel state information; and a priority of uplink control information is higher than a priority of sidelink control information.

The priority rule provides priorities of a plurality of different types of control information, so as to resolve a problem that control information with different priorities cannot be simultaneously sent in a case in which resources carrying the control information with different priorities overlap in time domain, and ensure sending of control information with a high priority.

In a possible implementation of the third aspect, that a priority of uplink control information is higher than a priority of sidelink control information includes at least one of the following priority rules: A priority of a hybrid automatic repeat request is higher than a priority of a sidelink hybrid automatic repeat request; a priority of a scheduling request is higher than a priority of a sidelink scheduling request; a priority of channel state information is higher than a priority of sidelink channel state information; a priority of aperiodic channel state information is higher than a priority of sidelink aperiodic channel state information; a priority of semi-persistent channel state information is higher than a priority of sidelink semi-persistent channel state information; a priority of periodic channel state information is higher than a priority of sidelink periodic channel state information; a priority of beam related channel state information is higher than a priority of sidelink beam related channel state information; a priority of non-beam related channel state information is higher than a priority of sidelink non-beam related channel state information; a priority of rank related channel state information is higher than a priority of sidelink rank related channel state information; a priority of non-rank related channel state information is higher than a priority of sidelink non-rank related channel state information; a priority of wideband channel state information is higher than a priority of sidelink wideband channel state information; and a priority of sub-band channel state information is higher than a priority of sidelink sub-band channel state information.

The priority rule provides priorities of a plurality of different types of control information, so as to resolve a problem that control information with different priorities cannot be simultaneously sent in a case in which resources carrying the control information with different priorities overlap in time domain, and ensure sending of control information with a high priority.

In a possible implementation of the third aspect, the priority rule for control information corresponding to at least two communication modes includes at least one of the following priority rules: A priority of sidelink feedback information corresponding to a sidelink whose communication mode is broadcast is higher than a priority of sidelink feedback information corresponding to a sidelink whose communication mode is multicast; a priority of sidelink feedback information corresponding to a sidelink whose communication mode is broadcast is higher than a priority of sidelink feedback information corresponding to a sidelink whose communication mode is unicast; and a priority of sidelink feedback information corresponding to a sidelink whose communication mode is multicast is higher than a priority of sidelink feedback information corresponding to a sidelink whose communication mode is unicast.

The priority rule provides priorities of control information corresponding to a plurality of different communication modes, so as to resolve a problem that control information with different priorities cannot be simultaneously sent in a case in which resources carrying the control information with different priorities overlap in time domain, and ensure sending of control information with a high priority.

In a possible implementation of the third aspect, the priority rule for control information corresponding to at least two communication modes includes at least one of the following priority rules: A priority of sidelink feedback information corresponding to a sidelink whose communication mode is broadcast is lower than a priority of sidelink feedback information corresponding to a sidelink whose communication mode is multicast; a priority of sidelink feedback information corresponding to a sidelink whose communication mode is broadcast is lower than a priority of sidelink feedback information corresponding to a sidelink whose communication mode is unicast; and a priority of sidelink feedback information corresponding to a sidelink whose communication mode is multicast is lower than a priority of sidelink feedback information corresponding to a sidelink whose communication mode is unicast.

The priority rule provides priorities of control information corresponding to a plurality of different communication modes, so as to resolve a problem that control information with different priorities cannot be simultaneously sent in a case in which resources carrying the control information with different priorities overlap in time domain, and ensure sending of control information with a high priority.

In a possible implementation of the third aspect, the priority rule for control information corresponding to at least two attributes includes at least one of the following priority rules: A priority of sidelink feedback information corresponding to a cell with a smaller cell number is higher than a priority of sidelink feedback information corresponding to a cell with a larger cell number; a priority of sidelink feedback information corresponding to a smaller channel state information configuration identifier is higher than a priority of sidelink feedback information corresponding to a larger channel state information configuration identifier; and a priority of control information corresponding to a smaller sending link number is higher than a priority of control information corresponding to a larger sending link number.

The priority rule provides priorities of control information corresponding to a plurality of different attributes, so as to resolve a problem that control information with different priorities cannot be simultaneously sent in a case in which resources carrying the control information with different priorities overlap in time domain, and ensure sending of control information with a high priority.

In a possible implementation of the third aspect, the priority rule for control information corresponding to at least two attributes includes at least one of the following priority rules: A priority of sidelink feedback information corresponding to a cell with a larger cell number is higher than a priority of sidelink feedback information corresponding to a cell with a smaller cell number; a priority of sidelink feedback information corresponding to a larger channel state information configuration identifier is higher than a priority of sidelink feedback information corresponding to a smaller channel state information configuration identifier; and a priority of control information corresponding to a larger sending link number is higher than a priority of control information corresponding to a smaller sending link number.

The priority rule provides priorities of control information corresponding to a plurality of different attributes, so as to resolve a problem that control information with different priorities cannot be simultaneously sent in a case in which resources carrying the control information with different priorities overlap in time domain, and ensure sending of control information with a high priority.

In a possible implementation of the third aspect, the determining L pieces of control information from M pieces of control information based on a priority rule includes: determining a priority sequence of the M pieces of control information based on the priority rule; and determining the L pieces of control information based on the priority sequence of the M pieces of control information.

The terminal apparatus may determine the priority sequence of the M pieces of control information based on the priority rule. The terminal apparatus may determine the L pieces of control information by comparing priority sequence numbers of the M pieces of control information. A calculation amount required by the terminal apparatus to determine the L pieces of control information is relatively small, and therefore, energy consumption required by the terminal apparatus to determine the L pieces of control information is reduced.

In a possible implementation of the third aspect, the priority rule indicates a priority rule for S pieces of control information corresponding to at least two types, at least two communication modes, and/or at least two attributes, priorities of S1 pieces of control information in the S pieces of control information are higher than priorities of S−S1 pieces of control information other than the S1 pieces of control information in the S pieces of control information, S1 is a positive integer greater than or equal to 1 and less than or equal to S, and S is a positive integer greater than or equal to 2. The determining L pieces of control information from M pieces of control information based on a priority rule includes: determining the L pieces of control information with highest priorities in the M pieces of control information based on a priority rule for the S1 pieces of control information.

The terminal apparatus may determine the L pieces of control information by determining whether the M pieces of control information include high-priority control information. The terminal apparatus does not need to determine priorities of control information other than the L pieces of control information in the M pieces of control information, so that an amount of data that needs to be processed by the terminal apparatus is reduced, and energy consumption required by the terminal apparatus to determine the L pieces of control information is reduced.

In a possible implementation of the third aspect, priorities of the L pieces of control information are higher than priorities of M−L pieces of control information other than the L pieces of control information in the M pieces of control information.

In a possible implementation of the third aspect, the determining L pieces of control information from M pieces of control information based on a priority rule includes: determining the L pieces of control information from the M pieces of control information based on the priority rule and a channel capacity, where a total quantity of bits of the L pieces of control information is less than or equal to the channel capacity.

The terminal apparatus may determine the L pieces of control information based on the channel capacity, thereby improving flexibility of determining the L pieces of control information. In addition, it is ensured that the channel capacity is sufficient to transmit the L pieces of control information, thereby improving transmission accuracy of the L pieces of control information.

In a possible implementation of the third aspect, before the determining the L pieces of control information from the M pieces of control information based on the priority rule and a channel capacity, the method further includes: The terminal apparatus determines the channel capacity.

In a possible implementation of the third aspect, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

Total overheads of the L pieces of control information with highest priorities in the M pieces of control information are less than the channel capacity, and total overheads of L+1 pieces of control information with highest priorities in the M pieces of control information are greater than the channel capacity. Sending the L pieces of control information can ensure sending of control information with a high priority, and further improve channel utilization.

In a possible implementation of the third aspect, less than L pieces of control information may be sent. Although the channel capacity is not fully used, less information is transmitted by using more resources, so that a lower-order modulation scheme and/or a lower bit rate can be used to improve an information transmission success rate.

In a possible implementation of the third aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: The terminal apparatus determines a priority sequence of the M pieces of control information based on the N1 priority sub-rules; and determines the L pieces of control information from the M pieces of control information based on the priority sequence of the M pieces of control information.

The terminal apparatus may determine the L pieces of control information based on some sub-rules with relatively high priorities in the priority rule, so that a quantity of determining times of the terminal apparatus is reduced, priorities of the control information are more accurate, and a calculation amount required by the terminal apparatus for determining the L pieces of control information is reduced, and therefore, energy consumption required by the terminal apparatus to determine the L pieces of control information is reduced.

In a possible implementation of the third aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The processing module is specifically configured to determine a priority sequence of the M pieces of control information first based on the N1 priority sub-rules and then based on the N−N1 priority sub-rules; and the processing module is specifically configured to determine the L pieces of control information from the M pieces of control information based on the priority sequence of the M pieces of control information.

In a possible implementation of the third aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: determining a priority sequence of the M pieces of control information first based on the N1 priority sub-rules and then based on the N−N1 priority sub-rules; and determining the L pieces of control information from the M pieces of control information based on the priority sequence of the M pieces of control information.

The terminal apparatus may first determine a priority sequence of the M pieces of control information based on some sub-rules with relatively high priorities in the priority rule, where the M pieces of control information may include some pieces of control information whose priorities are the same and cannot be distinguished. Then, the priority sequence of the M pieces of control information is determined based on some sub-rules whose priorities are relatively low in the priority rule, so that accuracy of the priority sequence of the control information can be improved.

In a possible implementation of the third aspect, that the terminal apparatus receives the L pieces of control information includes: The terminal apparatus receives the L pieces of control information on at least one of a physical sidelink feedback channel, a physical sidelink control channel, a physical sidelink shared channel, a physical uplink control channel, or a physical uplink shared channel.

According to a fourth aspect, a terminal apparatus is provided. The terminal apparatus includes: a processing module, configured to determine L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M; and a sending module, configured to send the L pieces of control information.

In a possible implementation of the fourth aspect, the priority rule is used to determine at least one of a priority rule for at least two types of control information, a priority rule for control information corresponding to at least two communication modes, and a priority rule for control information corresponding to at least two attributes.

In a possible implementation of the fourth aspect, the priority rule for at least two types of control information includes at least one of the following priority rules: A priority of a sidelink hybrid automatic repeat request is higher than a priority of sidelink channel state information; a priority of a sidelink scheduling request is higher than a priority of sidelink channel state information; a priority of sidelink aperiodic channel state information is higher than a priority of sidelink semi-persistent channel state information; a priority of sidelink aperiodic channel state information is higher than a priority of sidelink periodic channel state information; a priority of sidelink semi-persistent channel state information is higher than a priority of sidelink periodic channel state information; a priority of sidelink beam related channel state information is higher than a priority of sidelink non-beam related channel state information; a priority of sidelink rank related channel state information is higher than a priority of sidelink non-rank related channel state information; a priority of sidelink wideband channel state information is higher than a priority of sidelink sub-band channel state information; and a priority of uplink control information is higher than a priority of sidelink control information.

In a possible implementation of the fourth aspect, that a priority of uplink control information is higher than a priority of sidelink control information includes at least one of the following priority rules: A priority of a hybrid automatic repeat request is higher than a priority of a sidelink hybrid automatic repeat request; a priority of a scheduling request is higher than a priority of a sidelink scheduling request; a priority of channel state information is higher than a priority of sidelink channel state information; a priority of aperiodic channel state information is higher than a priority of sidelink aperiodic channel state information; a priority of semi-persistent channel state information is higher than a priority of sidelink semi-persistent channel state information; a priority of periodic channel state information is higher than a priority of sidelink periodic channel state information; a priority of beam related channel state information is higher than a priority of sidelink beam related channel state information; a priority of non-beam related channel state information is higher than a priority of sidelink non-beam related channel state information; a priority of rank related channel state information is higher than a priority of sidelink rank related channel state information; a priority of non-rank related channel state information is higher than a priority of sidelink non-rank related channel state information; a priority of wideband channel state information is higher than a priority of sidelink wideband channel state information; and a priority of sub-band channel state information is higher than a priority of sidelink sub-band channel state information.

In a possible implementation of the fourth aspect, the priority rule for control information corresponding to at least two communication modes includes at least one of the following priority rules: A priority of sidelink feedback information corresponding to a sidelink whose communication mode is broadcast is higher than a priority of sidelink feedback information corresponding to a sidelink whose communication mode is multicast; a priority of sidelink feedback information corresponding to a sidelink whose communication mode is broadcast is higher than a priority of sidelink feedback information corresponding to a sidelink whose communication mode is unicast; and a priority of sidelink feedback information corresponding to a sidelink whose communication mode is multicast is higher than a priority of sidelink feedback information corresponding to a sidelink whose communication mode is unicast.

In a possible implementation of the fourth aspect, the priority rule for control information corresponding to at least two communication modes includes at least one of the following priority rules: A priority of sidelink feedback information corresponding to a sidelink whose communication mode is broadcast is lower than a priority of sidelink feedback information corresponding to a sidelink whose communication mode is multicast; a priority of sidelink feedback information corresponding to a sidelink whose communication mode is broadcast is lower than a priority of sidelink feedback information corresponding to a sidelink whose communication mode is unicast; and a priority of sidelink feedback information corresponding to a sidelink whose communication mode is multicast is lower than a priority of sidelink feedback information corresponding to a sidelink whose communication mode is unicast.

In a possible implementation of the fourth aspect, the priority rule for control information corresponding to at least two attributes includes at least one of the following priority rules: A priority of sidelink feedback information corresponding to a cell with a smaller cell number is higher than a priority of sidelink feedback information corresponding to a cell with a larger cell number; a priority of sidelink feedback information corresponding to a smaller channel state information configuration identifier is higher than a priority of sidelink feedback information corresponding to a larger channel state information configuration identifier; and a priority of control information corresponding to a smaller sending link number is higher than a priority of control information corresponding to a larger sending link number.

In a possible implementation of the fourth aspect, the priority rule for control information corresponding to at least two attributes includes at least one of the following priority rules: A priority of sidelink feedback information corresponding to a cell with a larger cell number is higher than a priority of sidelink feedback information corresponding to a cell with a smaller cell number; a priority of sidelink feedback information corresponding to a larger channel state information configuration identifier is higher than a priority of sidelink feedback information corresponding to a smaller channel state information configuration identifier; and a priority of control information corresponding to a larger sending link number is higher than a priority of control information corresponding to a smaller sending link number.

In a possible implementation of the fourth aspect, the processing module is specifically configured to determine a priority sequence of the M pieces of control information based on the priority rule; and the processing module is specifically configured to determine the L pieces of control information based on the priority sequence of the M pieces of control information.

In a possible implementation of the fourth aspect, the priority rule indicates a priority sequence of S pieces of control information corresponding to at least two types, at least two communication modes, and/or at least two attributes, priorities of S1 pieces of control information in the S pieces of control information are higher than priorities of S−S1 pieces of control information other than the S1 pieces of control information in the S pieces of control information, S1 is a positive integer greater than or equal to 1 and less than or equal to S, and S is a positive integer greater than or equal to 2. The processing module is specifically configured to determine the L pieces of control information with highest priorities in the M pieces of control information based on a priority sequence of the S1 pieces of control information.

In a possible implementation of the fourth aspect, priorities of the L pieces of control information are higher than priorities of M−L pieces of control information other than the L pieces of control information in the M pieces of control information.

In a possible implementation of the fourth aspect, the processing module is specifically configured to determine the L pieces of control information from the M pieces of control information based on the priority rule and a channel capacity, where a total quantity of bits of the L pieces of control information is less than or equal to the channel capacity.

In a possible implementation of the fourth aspect, the processing module is further configured to determine the channel capacity.

In a possible implementation of the fourth aspect, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

In a possible implementation of the fourth aspect, less than L pieces of control information may be sent. Although the channel capacity is not fully used, less information is transmitted by using more resources, so that a lower-order modulation scheme and/or a lower bit rate can be used to improve an information transmission success rate.

In a possible implementation of the fourth aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The processing module is specifically configured to: determine a priority sequence of the M pieces of control information based on the N1 priority sub-rules; and determine the L pieces of control information from the M pieces of control information based on the priority sequence of the M pieces of control information.

In a possible implementation of the fourth aspect, the sending module is specifically configured to send the L pieces of control information on at least one of a physical sidelink feedback channel, a physical sidelink control channel, a physical sidelink shared channel, a physical uplink control channel, or a physical uplink shared channel.

According to a fifth aspect, a network apparatus is provided. The network apparatus includes: a processing module, configured to determine L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M; and a receiving module, configured to receive the L pieces of control information.

In a possible implementation of the fifth aspect, the priority rule is used to determine at least one of a priority rule for at least two types of control information, a priority rule for control information corresponding to at least two communication modes, and a priority rule for control information corresponding to at least two attributes.

In a possible implementation of the fifth aspect, the priority rule for at least two types of control information includes at least one of the following priority rules: A priority of a sidelink hybrid automatic repeat request is higher than a priority of sidelink channel state information; a priority of a sidelink scheduling request is higher than a priority of sidelink channel state information; a priority of sidelink aperiodic channel state information is higher than a priority of sidelink semi-persistent channel state information; a priority of sidelink aperiodic channel state information is higher than a priority of sidelink periodic channel state information; a priority of sidelink semi-persistent channel state information is higher than a priority of sidelink periodic channel state information; a priority of sidelink beam related channel state information is higher than a priority of sidelink non-beam related channel state information; a priority of sidelink rank related channel state information is higher than a priority of sidelink non-rank related channel state information; a priority of sidelink wideband channel state information is higher than a priority of sidelink sub-band channel state information; and a priority of uplink control information is higher than a priority of sidelink control information.

In a possible implementation of the fifth aspect, that a priority of uplink control information is higher than a priority of sidelink control information includes at least one of the following priority rules: A priority of a hybrid automatic repeat request is higher than a priority of a sidelink hybrid automatic repeat request; a priority of a scheduling request is higher than a priority of a sidelink scheduling request; a priority of channel state information is higher than a priority of sidelink channel state information; a priority of aperiodic channel state information is higher than a priority of sidelink aperiodic channel state information; a priority of semi-persistent channel state information is higher than a priority of sidelink semi-persistent channel state information; a priority of periodic channel state information is higher than a priority of sidelink periodic channel state information; a priority of beam related channel state information is higher than a priority of sidelink beam related channel state information; a priority of non-beam related channel state information is higher than a priority of sidelink non-beam related channel state information; a priority of rank related channel state information is higher than a priority of sidelink rank related channel state information; a priority of non-rank related channel state information is higher than a priority of sidelink non-rank related channel state information; a priority of wideband channel state information is higher than a priority of sidelink wideband channel state information; and a priority of sub-band channel state information is higher than a priority of sidelink sub-band channel state information.

In a possible implementation of the fifth aspect, the priority rule for control information corresponding to at least two communication modes includes at least one of the following priority rules: A priority of sidelink feedback information corresponding to a sidelink whose communication mode is broadcast is higher than a priority of sidelink feedback information corresponding to a sidelink whose communication mode is multicast; a priority of sidelink feedback information corresponding to a sidelink whose communication mode is broadcast is higher than a priority of sidelink feedback information corresponding to a sidelink whose communication mode is unicast; and a priority of sidelink feedback information corresponding to a sidelink whose communication mode is multicast is higher than a priority of sidelink feedback information corresponding to a sidelink whose communication mode is unicast.

In a possible implementation of the fifth aspect, the priority rule for control information corresponding to at least two communication modes includes at least one of the following priority rules: A priority of sidelink feedback information corresponding to a sidelink whose communication mode is broadcast is lower than a priority of sidelink feedback information corresponding to a sidelink whose communication mode is multicast; a priority of sidelink feedback information corresponding to a sidelink whose communication mode is broadcast is lower than a priority of sidelink feedback information corresponding to a sidelink whose communication mode is unicast; and a priority of sidelink feedback information corresponding to a sidelink whose communication mode is multicast is lower than a priority of sidelink feedback information corresponding to a sidelink whose communication mode is unicast.

In a possible implementation of the fifth aspect, the priority rule for control information corresponding to at least two attributes includes at least one of the following priority rules: A priority of sidelink feedback information corresponding to a cell with a smaller cell number is higher than a priority of sidelink feedback information corresponding to a cell with a larger cell number; a priority of sidelink feedback information corresponding to a smaller channel state information configuration identifier is higher than a priority of sidelink feedback information corresponding to a larger channel state information configuration identifier; and a priority of control information corresponding to a smaller receiving link number is higher than a priority of control information corresponding to a larger receiving link number.

In a possible implementation of the fifth aspect, the priority rule for control information corresponding to at least two attributes includes at least one of the following priority rules: A priority of sidelink feedback information corresponding to a cell with a larger cell number is higher than a priority of sidelink feedback information corresponding to a cell with a smaller cell number; a priority of sidelink feedback information corresponding to a larger channel state information configuration identifier is higher than a priority of sidelink feedback information corresponding to a smaller channel state information configuration identifier; and a priority of control information corresponding to a larger sending link number is higher than a priority of control information corresponding to a smaller sending link number.

In a possible implementation of the fifth aspect, the processing module is specifically configured to determine a priority sequence of the M pieces of control information based on the priority rule; and the processing module is specifically configured to determine the L pieces of control information based on the priority sequence of the M pieces of control information.

In a possible implementation of the fifth aspect, the priority rule indicates a priority sequence of S pieces of control information corresponding to at least two types, at least two communication modes, and/or at least two attributes, priorities of S1 pieces of control information in the S pieces of control information are higher than priorities of S−S1 pieces of control information other than the S1 pieces of control information in the S pieces of control information, S1 is a positive integer greater than or equal to 1 and less than or equal to S, and S is a positive integer greater than or equal to 2. The processing module is specifically configured to determine the L pieces of control information with highest priorities in the M pieces of control information based on a priority sequence of the S1 pieces of control information.

In a possible implementation of the fifth aspect, priorities of the L pieces of control information are higher than priorities of M−L pieces of control information other than the L pieces of control information in the M pieces of control information.

In a possible implementation of the fifth aspect, the processing module is specifically configured to determine the L pieces of control information from the M pieces of control information based on the priority rule and a channel capacity, where a total quantity of bits of the L pieces of control information is less than or equal to the channel capacity.

In a possible implementation of the fifth aspect, the processing module is further configured to determine the channel capacity.

In a possible implementation of the fifth aspect, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

In a possible implementation of the fifth aspect, less than L pieces of control information may be sent. Although the channel capacity is not fully used, less information is transmitted by using more resources, so that a lower-order modulation scheme and/or a lower bit rate can be used to improve an information transmission success rate.

In a possible implementation of the fifth aspect, the priority rule includes N priority sub-rules, and priorities of N1 priority sub-rules in the N priority sub-rules are higher than priorities of N–N1 priority sub-rules in the N priority sub-rules other than the N1 priority sub-rules, N1 is a positive integer greater than or equal to 1 and less than or equal to N, and N is a positive integer greater than or equal to 2. The processing module is specifically configured to: determine a priority sequence of the M pieces of control information based on the N1 priority sub-rules; and determine the L pieces of control information from the M pieces of control information based on the priority sequence of the M pieces of control information.

In a possible implementation of the fifth aspect, the priority rule includes N priority sub-rules, and priorities of N1 priority sub-rules in the N priority sub-rules are higher than priorities of N–N1 priority sub-rules in the N priority sub-rules other than the N1 priority sub-rules, N1 is a positive integer greater than or equal to 1 and less than or equal to N, and N is a positive integer greater than or equal to 2. The processing module is specifically configured to determine a priority sequence of the M pieces of control information first based on the N1 priority sub-rules and then based on the N–N1 priority sub-rules; and the processing module is specifically configured to determine the L pieces of control information from the M pieces of control information based on the priority sequence of the M pieces of control information.

In a possible implementation of the fifth aspect, the receiving module is specifically configured to receive the L pieces of control information on at least one of a physical sidelink feedback channel, a physical sidelink control channel, a physical sidelink shared channel, a physical uplink control channel, or a physical uplink shared channel.

According to a sixth aspect, a terminal apparatus is provided. The terminal apparatus includes: a processing module, configured to determine L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M; and a receiving module, configured to receive the L pieces of control information.

In a possible implementation of the sixth aspect, the priority rule is used to determine at least one of a priority rule for at least two types of control information, a priority rule for control information corresponding to at least two communication modes, and a priority rule for control information corresponding to at least two attributes.

In a possible implementation of the sixth aspect, the priority rule for at least two types of control information includes at least one of the following priority rules: A priority of a sidelink hybrid automatic repeat request is higher than a priority of sidelink channel state information; a priority of a sidelink scheduling request is higher than a priority of sidelink channel state information; a priority of sidelink aperiodic channel state information is higher than a priority of sidelink semi-persistent channel state information; a priority of sidelink aperiodic channel state information is higher than a priority of sidelink periodic channel state information; a priority of sidelink semi-persistent channel state information is higher than a priority of sidelink periodic channel state information; a priority of sidelink beam related channel state information is higher than a priority of sidelink non-beam related channel state information; a priority of sidelink rank related channel state information is higher than a priority of sidelink non-rank related channel state information; a priority of sidelink wideband channel state information is higher than a priority of sidelink sub-band channel state information; and a priority of uplink control information is higher than a priority of sidelink control information.

In a possible implementation of the sixth aspect, that a priority of uplink control information is higher than a priority of sidelink control information includes at least one of the following priority rules: A priority of a hybrid automatic repeat request is higher than a priority of a sidelink hybrid automatic repeat request; a priority of a scheduling request is higher than a priority of a sidelink scheduling request; a priority of channel state information is higher than a priority of sidelink channel state information; a priority of aperiodic channel state information is higher than a priority of sidelink aperiodic channel state information; a priority of semi-persistent channel state information is higher than a priority of sidelink semi-persistent channel state information; a priority of periodic channel state information is higher than a priority of sidelink periodic channel state information; a priority of beam related channel state information is higher than a priority of sidelink beam related channel state information; a priority of non-beam related channel state information is higher than a priority of sidelink non-beam related channel state information; a priority of rank related channel state information is higher than a priority of sidelink rank related channel state information; a priority of non-rank related channel state information is higher than a priority of sidelink non-rank related channel state information; a priority of wideband channel state information is higher than a priority of sidelink wideband channel state information; and a priority of sub-band channel state information is higher than a priority of sidelink sub-band channel state information.

In a possible implementation of the sixth aspect, the priority rule for control information corresponding to at least two communication modes includes at least one of the following priority rules: A priority of sidelink feedback information corresponding to a sidelink whose communication mode is broadcast is higher than a priority of sidelink feedback information corresponding to a sidelink whose communication mode is multicast; a priority of sidelink feedback information corresponding to a sidelink whose communication mode is broadcast is higher than a priority of sidelink feedback information corresponding to a sidelink whose communication mode is unicast; and a priority of sidelink feedback information corresponding to a sidelink whose communication mode is multicast is higher than a priority of sidelink feedback information corresponding to a sidelink whose communication mode is unicast.

In a possible implementation of the sixth aspect, the priority rule for control information corresponding to at least two communication modes includes at least one of the following priority rules: A priority of sidelink feedback information corresponding to a sidelink whose communication mode is broadcast is lower than a priority of sidelink feedback information corresponding to a sidelink whose communication mode is multicast; a priority of sidelink feedback information corresponding to a sidelink whose communication mode is broadcast is lower than a priority of sidelink feedback information corresponding to a sidelink whose communication mode is unicast; and a priority of sidelink feedback information corresponding to a sidelink whose communication mode is multicast is lower than a priority of sidelink feedback information corresponding to a sidelink whose communication mode is unicast.

In a possible implementation of the sixth aspect, the priority rule for control information corresponding to at least two attributes includes at least one of the following priority rules: A priority of sidelink feedback information corresponding to a cell with a smaller cell number is higher than a priority of sidelink feedback information corresponding to a cell with a larger cell number; a priority of sidelink feedback information corresponding to a smaller channel state information configuration identifier is higher than a priority of sidelink feedback information corresponding to a larger channel state information configuration identifier; and a priority of control information corresponding to a smaller receiving link number is higher than a priority of control information corresponding to a larger receiving link number.

In a possible implementation of the sixth aspect, the priority rule for control information corresponding to at least two attributes includes at least one of the following priority rules: A priority of sidelink feedback information corresponding to a cell with a larger cell number is higher than a priority of sidelink feedback information corresponding to a cell with a smaller cell number; a priority of sidelink feedback information corresponding to a larger channel state information configuration identifier is higher than a priority of sidelink feedback information corresponding to a smaller channel state information configuration identifier; and a priority of control information corresponding to a larger sending link number is higher than a priority of control information corresponding to a smaller sending link number.

In a possible implementation of the sixth aspect, the processing module is specifically configured to determine a priority sequence of the M pieces of control information based on the priority rule; and the processing module is specifically configured to determine the L pieces of control information based on the priority sequence of the M pieces of control information.

In a possible implementation of the sixth aspect, the priority rule indicates a priority sequence of S pieces of control information corresponding to at least two types, at least two communication modes, and/or at least two attributes, priorities of S1 pieces of control information in the S pieces of control information are higher than priorities of S−S1 pieces of control information other than the S1 pieces of control information in the S pieces of control information, S1 is a positive integer greater than or equal to 1 and less than or equal to S, and S is a positive integer greater than or equal to 2. The processing module is specifically configured to determine the L pieces of control information with highest priorities in the M pieces of control information based on a priority sequence of the S1 pieces of control information.

In a possible implementation of the sixth aspect, priorities of the L pieces of control information are higher than priorities of M−L pieces of control information other than the L pieces of control information in the M pieces of control information.

In a possible implementation of the sixth aspect, the processing module is specifically configured to determine the L pieces of control information from the M pieces of control information based on the priority rule and a channel capacity, where a total quantity of bits of the L pieces of control information is less than or equal to the channel capacity.

In a possible implementation of the sixth aspect, the processing module is further configured to determine the channel capacity.

In a possible implementation of the sixth aspect, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

In a possible implementation of the sixth aspect, less than L pieces of control information may be sent. Although the channel capacity is not fully used, less information is transmitted by using more resources, so that a lower-order modulation scheme and/or a lower bit rate can be used to improve an information transmission success rate.

In a possible implementation of the sixth aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The processing module is specifically configured to: determine a priority sequence of the M pieces of control information based on the N1 priority sub-rules; and determine the L pieces of control information from the M pieces of control information based on the priority sequence of the M pieces of control information.

In a possible implementation of the sixth aspect, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The processing module is specifically configured to determine a priority sequence of the M pieces of control information first based on the N1 priority sub-rules and then based on the N−N1 priority sub-rules; and the processing module is specifically configured to determine the L pieces of control information from the M pieces of control information based on the priority sequence of the M pieces of control information.

In a possible implementation of the sixth aspect, the receiving module is specifically configured to receive the L pieces of control information on at least one of a physical sidelink feedback channel, a physical sidelink control channel, a physical sidelink shared channel, a physical uplink control channel, or a physical uplink shared channel.

According to a seventh aspect, an embodiment of this application provides a communications apparatus. The apparatus includes modules configured to perform any one of the first aspect or the possible implementations of the first aspect.

Optionally, the communications apparatus in the seventh aspect may be a terminal, or may be a component (for example, a chip or a circuit) that can be used for the terminal.

According to an eighth aspect, an embodiment of this application provides a communications apparatus. The apparatus includes modules configured to perform any one of the second aspect or the possible implementations of the second aspect.

Optionally, the communications apparatus in the eighth aspect may be a base station, or may be a component (for example, a chip or a circuit) that can be used for the base station.

According to a ninth aspect, an embodiment of this application provides a communications apparatus. The apparatus includes modules configured to perform any one of the third aspect or the possible implementations of the third aspect.

Optionally, the communications apparatus in the ninth aspect may be a terminal, or may be a component (for example, a chip or a circuit) that can be used for the terminal.

According to a tenth aspect, an embodiment of this application provides a storage medium. The storage medium stores instructions used to implement the method according to any one of the first aspect or the possible implementations of the first aspect.

According to an eleventh aspect, an embodiment of this application provides a storage medium. The storage medium stores instructions used to implement the method according to any one of the second aspect or the possible implementations of the second aspect.

According to a twelfth aspect, an embodiment of this application provides a storage medium. The storage medium stores instructions used to implement the method according to any one of the third aspect or the possible implementations of the third aspect.

According to a thirteenth aspect, this application provides a computer program product including instructions. When the computer program product runs on a computer, the computer is enabled to perform the method according to any one of the first aspect or the possible implementations of the first aspect.

According to a fourteenth aspect, this application provides a computer program product including instructions. When the computer program product runs on a computer, the computer is enabled to perform the method according to any one of the second aspect or the possible implementations of the second aspect.

According to a fifteenth aspect, this application provides a computer program product including instructions. When the computer program product runs on a computer, the computer is enabled to perform the method according to any one of the third aspect or the possible implementations of the third aspect.

According to a sixteenth aspect, this application provides a communications apparatus, where the communications apparatus includes at least one processor and a communications interface, the communications interface is used by the communications apparatus to exchange information with another communications apparatus, and when program instructions are executed by the at least one processor, the communications apparatus is enabled to implement a function on the transmit end apparatus in the method according to any one of the first aspect or the possible implementations of the first aspect.

According to a seventeenth aspect, this application provides a communications apparatus, where the communications apparatus includes at least one processor and a communications interface, the communications interface is used by the communications apparatus to exchange information with another communications apparatus, and when program instructions are executed by the at least one processor, the communications apparatus is enabled to implement a function on the receive end apparatus in the method according to any one of the second aspect or the possible implementations of the second aspect.

According to an eighteenth aspect, this application provides a communications apparatus, where the communications apparatus includes at least one processor and a communications interface, the communications interface is used by the communications apparatus to exchange information with another communications apparatus, and when program instructions are executed by the at least one processor, the communications apparatus is enabled to implement a function on the receive end apparatus in the method according to any one of the third aspect or the possible implementations of the third aspect.

According to a nineteenth aspect, this application provides a chip system, where the chip system includes at least one processor, and when program instructions are executed by the at least one processor, a function on the transmit end apparatus in the method according to any one of the first aspect or the possible implementations of the first aspect is implemented.

According to a twentieth aspect, this application provides a chip system, where the chip system includes at least one processor, and when program instructions are executed by the at least one processor, a function on the receive end apparatus in the method according to any one of the second aspect or the possible implementations of the second aspect is implemented.

According to a twenty-first aspect, this application provides a chip system, where the chip system includes at least one processor, and when program instructions are executed by the at least one processor, a function on the receive end apparatus in the method according to any one of the third aspect or the possible implementations of the third aspect is implemented.

DESCRIPTION OF EMBODIMENTS

Figure 1:
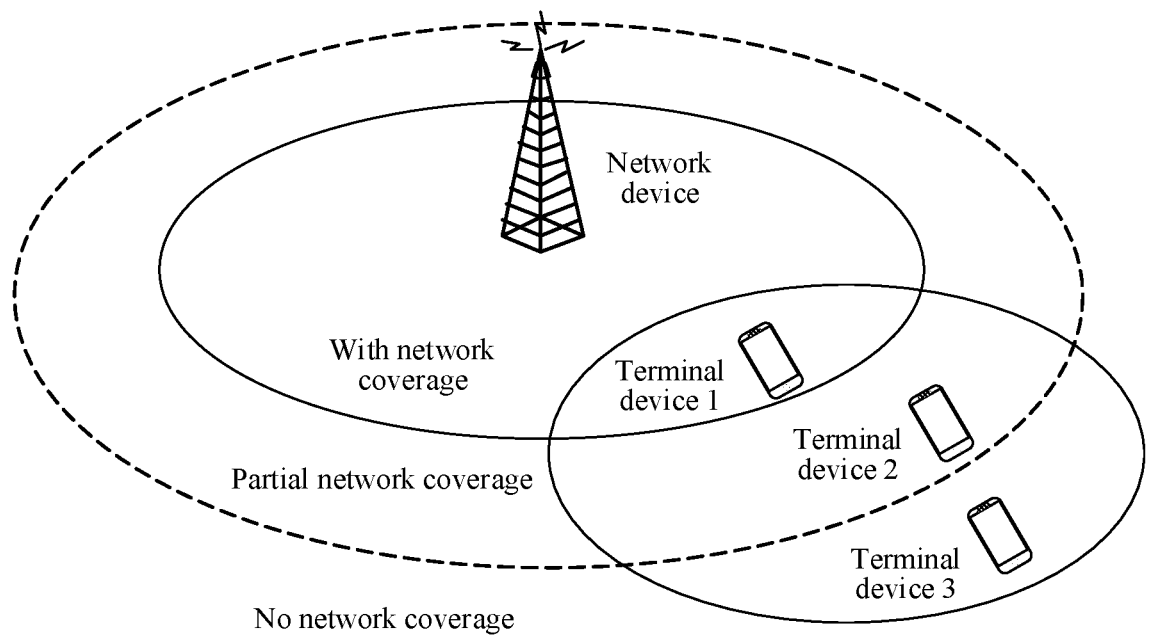
FIG. 1 is a schematic diagram of a D2D communication scenario.

The following describes technical solutions in this application with reference to the accompanying drawings.

In this application, "at least one" means one or more, and "a plurality of" means two or more. The term "and/or" describes an association relationship between associated objects and represents that three relationships may exist. For example, A and/or B may represent the following cases:

Only A exists, both A and B exist, and only B exists, where A and B may be singular or plural. The character "/" usually indicates an "or" relationship between the associated objects. "At least one of the following items (pieces)" or a similar expression thereof means any combination of these items, including a single item (piece) or any combination of a plurality of items (pieces). For example, at least one of a, b, or c may indicate: a, b, c, a-b, a-c, b-c, or a-b-c, where a, b, and c may be in a singular or plural form. In addition, in the embodiments of this application, terms such as "first" and "second" do not limit a quantity or an execution sequence. In addition, in the embodiments of this application, numbers such as "301", "402", and "503" are merely used as identifiers for ease of description, and do not limit a sequence of performing steps.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word such as "example" or "for example" is intended to present a related concept in a specific manner.

The technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a future 5th generation (5G) system, or a new radio (NR) system. In addition, the technical solutions in the embodiments of this application may be applied to a future-oriented communications technology. The technical solutions provided in the embodiments of the present invention are applicable to a communications system that uses a new communication technology provided that the communications system involves D2D communication. A system architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that with evolution of a network architecture and emergence of a new service scenario, the technical solutions provided in the embodiments of the present invention are also applicable to similar technical problems.

D2D scenarios may be classified into three types: a scenario with network coverage, a scenario with partial network coverage, and a scenario without network coverage, as shown in FIG. 1. In the scenario with network coverage, all D2D devices are in coverage of a network apparatus. In the scenario with partial network coverage, some D2D devices are in coverage of a network apparatus, and some D2D devices are out of the coverage of the network apparatus. In the scenario without network coverage, all D2D devices are out of coverage of a network apparatus. For example, a scenario in which a terminal apparatus 1 can receive a signal of a network apparatus is a scenario with network coverage, and the terminal apparatus 1 is a terminal apparatus in network coverage. For another example, a scenario in which a terminal apparatus 2 cannot receive a signal of the network apparatus but can receive a signal of the terminal apparatus 1 in the network coverage is a scenario with partial network coverage, and the terminal apparatus 2 is a terminal apparatus in partial network coverage. For another example, a scenario in which a terminal apparatus 3 cannot receive the foregoing two signals is a scenario without network coverage, and the terminal apparatus 3 is a terminal apparatus outside the network coverage.

Figure 2:
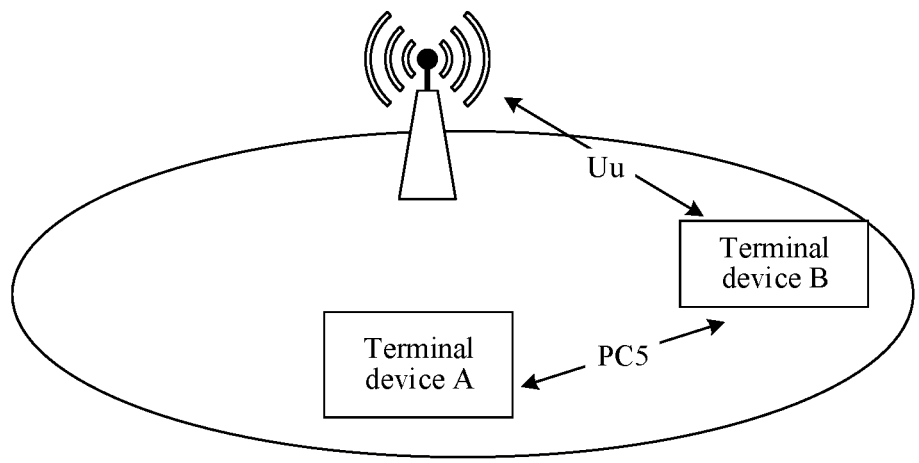
FIG. 2 is a schematic diagram of a V2X network system architecture.

Anew radio access technology (NR) is a current mainstream wireless communications technology. For a D2D service feature and a new service requirement, the new radio access technology can support D2D communication with a lower latency and higher reliability. FIG. 2 is an architectural diagram of a D2D network system. In the D2D system shown in the figure, there are mainly two types of air interfaces: a communications interface (a Uu interface) between a terminal apparatus and a network apparatus, and a communications interface (a PC5 interface) between terminal apparatuses (for example, a terminal apparatus A and a terminal apparatus B in FIG. 2). The Uu interface is used for communication between the terminal apparatus and the network apparatus or a roadside unit, and the PC5 interface is used for SL communication between terminal apparatuses.

There are mainly two resource allocation modes for D2D device communication. Mode 1 is a centralized control method. D2D resources are allocated by a network apparatus, and resources are allocated to a transmit end terminal apparatus for use in a scheduling manner. The centralized control resource allocation is mainly for a scenario with network coverage. Mode 2 is a contention-based distributed resource multiplexing method. A transmit end terminal apparatus obtains a sending resource from a resource pool in a contention manner. In a scenario with network coverage, the resource pool is a whole block of resources obtained through division performed by a network apparatus, and a D2D terminal apparatus contends for a resource in the whole block of resources. In a scenario without network coverage, the resource pool is a predefined block of resources that can be obtained by a D2D terminal apparatus, and the D2D terminal apparatus contends for a resource in the predefined resources.

There are mainly two types of resource allocation for D2D device discovery. Type 1 is a contention-based distributed resource multiplexing method. A transmit end terminal apparatus obtains a resource from a resource pool in a contention manner. In a scenario with network coverage, the resource pool is a whole block of resources obtained through division performed by a network apparatus, and a D2D terminal apparatus contends for a resource in the whole block of resources. In a scenario without network coverage, the resource pool is a predefined block of resources that can be obtained by a D2D terminal apparatus, and the D2D terminal apparatus contends for a resource in the predefined resources. Type 2 is a centralized control method. D2D resources are allocated by a network apparatus, and resources are allocated to a transmit end terminal apparatus for use in a scheduling manner. The centralized control resource allocation is mainly for a scenario with network coverage.

Figure 3:
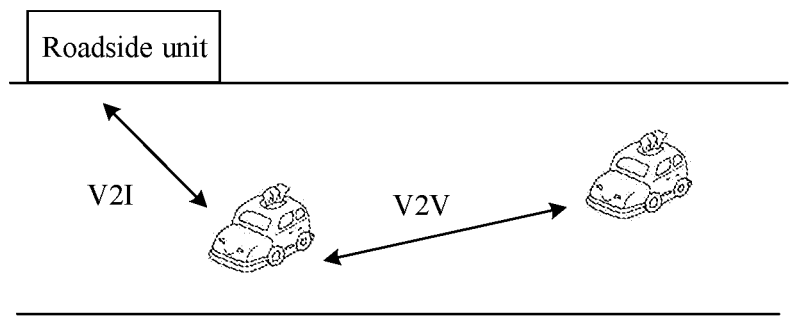
FIG. 3 is a schematic diagram of a V2X communication scenario.

To improve safety and intelligence of a transportation system, the concept of an intelligent transportation system is emerging gradually. Intelligent transportation can use nextgeneration communications networks and data processing capabilities to improve overall efficiency of the transportation system, reduce energy losses, and improve safety and convenience of transportation. V2X is a key technology for a future intelligent transportation system. The V2X can obtain a series of traffic information such as real-time road conditions, road information, and pedestrian information in communications manners such as vehicle-to-vehicle (V2V) communication, vehicle-to-infrastructure (V2I) communication, vehicle-to-pedestrian (V2P) communication, and vehicle-to-network (V2N) communication, to improve driving safety, reduce congestion, improve traffic efficiency, provide in-vehicle entertainment information, and the like. FIG. 3 shows a V2X communication scenario. As shown in FIG. 3, when vehicles communicate with each other through V2V, a vehicle may broadcast information such as a vehicle speed, a driving direction, a specific position, and an emergency brake status to a surrounding vehicle. After obtaining such information, a driver of the surrounding vehicle can better perceive traffic conditions beyond the line-of-sight distance, so as to predict and avoid dangerous conditions. For V2I communication, in addition to the foregoing exchange of security information, a roadside infrastructure, for example, a road side unit (RSU), may provide various types of service information and data network access for a vehicle, for example, electronic toll collection and in-vehicle entertainment. These functions greatly improve traffic intelligence.

The terminal apparatus in this application may be a device or a module in a device that has a wireless transceiver function and can provide a communication service for a user. Specifically, the terminal apparatus may be a device in a V2X system, a device in a D2D system, a device in an MTC system, or the like, for example, a vehicle or a communications apparatus, in a vehicle, that has a transceiver function and that can provide a communication service for a user. For example, the terminal apparatus may be an industrial robot, an industrial automation device, user equipment (UE), an access terminal, a subscriber unit, a subscriber station, a mobile station, a mobile console, a remote station, a remote terminal, a mobile device, a user terminal, a terminal, a wireless communications apparatus, a user agent, or a user apparatus. Alternatively, the terminal apparatus may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal apparatus in a 5G network or a future 5G network, or a terminal apparatus in a future evolved public land mobile network (PLMN). This is not limited in the embodiments of this application.

The network apparatus in the embodiments of this application may be a device configured to communicate with the terminal apparatus. The network apparatus may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network apparatus may be a relay node, an access point, a vehicle-mounted device, a road side unit (road side unit, RSU) in an Internet of Vehicles system, a wearable device, a network apparatus in a future 5G network, a network apparatus in a future evolved PLMN network, or the like. This is not limited in the embodiments of this application.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), and a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

In the embodiments of this application, the terminal apparatus or the network apparatus includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal apparatus, a network apparatus, or a functional module that is in a terminal apparatus or a network apparatus and that can invoke and execute the program.

A terminal apparatus group may include a plurality of terminal apparatuses. The plurality of terminal apparatuses in the terminal apparatus group may all be in an idle mode or an inactive mode (or an RRC IDLE mode). Alternatively, some terminal apparatuses in the terminal apparatus group are in an idle mode or an inactive mode (or an RRC IDLE mode), and some terminal apparatuses are in a connected mode (or a radio resource control (RRC) connected mode). In some scenarios (for example, a 5G NR V2X scenario), the terminal apparatus group may be referred to as a platoon.

The terminal apparatuses in the terminal apparatus group may communicate with each other by using an SL, and one or more terminal apparatuses in the terminal apparatus group may further communicate with one or more other terminal apparatuses outside the terminal apparatus group by using an SL. For example, a first terminal apparatus may communicate with any one or more terminal apparatuses in other terminal apparatuses based on an SL, and any one or more terminal apparatuses in the other terminal apparatuses may communicate with each other. A communication manner includes but is not limited to a unicast manner, a multicast manner, a broadcast manner, or the like. The first terminal apparatus or any one or more of the other terminal apparatuses may further communicate with one or more terminal apparatuses outside the terminal apparatus group. This is not limited in the embodiments of this application. SL resources required when the terminal apparatus group performs group communication may be configured by a network apparatus. For example, when a terminal apparatus is in an idle mode or an inactive mode, the terminal apparatus may obtain, by using a system information broadcast of a network, SL resources required when the terminal apparatus group performs group communication.

In LTE, a network apparatus sends a physical downlink shared channel (PDSCH) in a downlink direction, and a terminal apparatus feeds back a hybrid automatic repeat request-acknowledgment (HARQ-ACK), a hybrid automatic repeat request-negative acknowledgment (HARQ-NACK), or discontinuous transmission (DTX) on a physical uplink control channel (PUCCH) or a physical uplink shared channel (PUSCH), to notify the network device whether the PDSCH is received correctly. If the terminal apparatus sends the NACK, the network apparatus may start PDSCH retransmission. The terminal apparatus may further send a scheduling request (SR) to the network apparatus, to request the network apparatus to schedule a resource. The terminal apparatus further feeds back channel state information (CSI) that is of a downlink channel and that is obtained through measurement to the network apparatus.

In a device-to-device (D2D) system, a vehicle-to-everything (V2X) system, or the like, a transmit end terminal apparatus sends a physical sidelink control channel (PSCCH) or a physical sidelink shared channel (PSSCH), and a receive end terminal apparatus may send a sidelink hybrid automatic repeat request-acknowledgment (SL HARQ-ACK), a sidelink hybrid automatic repeat request-negative acknowledgment (SL HARQ-NACK), or discontinuous transmission (DTX) to the transmit end terminal apparatus or a network apparatus, to notify the transmit end terminal apparatus or the network apparatus whether the PSCCH or the PSSCH is correctly received. If the receive end terminal apparatus sends the NACK to the network apparatus, the network apparatus may schedule a resource for the transmit end terminal apparatus to perform retransmission of the PSSCH or the PSCCH. If the receive end terminal apparatus sends the NACK to the transmit end terminal apparatus, the transmit end terminal apparatus may start retransmission of the PSSCH or the PSCCH. If the receive end terminal apparatus sends the NACK to the transmit end terminal apparatus, the transmit end terminal apparatus may alternatively forward the NACK to the network apparatus, and the network apparatus may schedule a resource for the transmit end terminal apparatus to perform retransmission of the PSSCH or the PSCCH. The transmit end terminal apparatus may further send a scheduling request (SL SR) to request the network apparatus or another terminal apparatus to schedule a resource. The receive end terminal apparatus may further feed back sidelink channel state information (SL CSI) that is of a sidelink and that is obtained through measurement to the transmit end terminal apparatus or the network apparatus.

It should be noted that the channel state information in the embodiments of this application may be channel state information (CSI) in a strict sense, or may have a broader meaning. For example, the channel state information may include at least one of the following information: a channel quality indicator (CQI), a precoding matrix indicator (PMI), a rank indicator (RI), reference signal received power (RSRP), reference signal received quality (RSRQ), a path loss, a sounding reference signal SRS resource indicator (SRI), a channel state information-reference signal CSI-RS resource indicator (CRI), a received signal strength indicator (RSSI), a precoding type indicator (PTI), a moving direction of a vehicle, an interference condition, and the like.

For ease of description, the HARQ-ACK, the HARQ-NACK, the SR, and the CSI are collectively referred to as uplink control information in this application. The SL HARQ-ACK, the SL HARQ-NACK, the SL SR, and the SL CSI are collectively referred to as sidelink control information in this application. The uplink control information and the sidelink control information are collectively referred to as control information. The control information includes feedback information. The sidelink control information is also sometimes referred to as sidelink feedback information.

However, when total overheads of control information to be sent by a terminal apparatus are greater than a resource capacity that can be used by the terminal apparatus, if the terminal randomly determines control information to be sent, more important control information may be missed. Therefore, a technical solution for sending and receiving control information needs to be designed.

Figure 4:
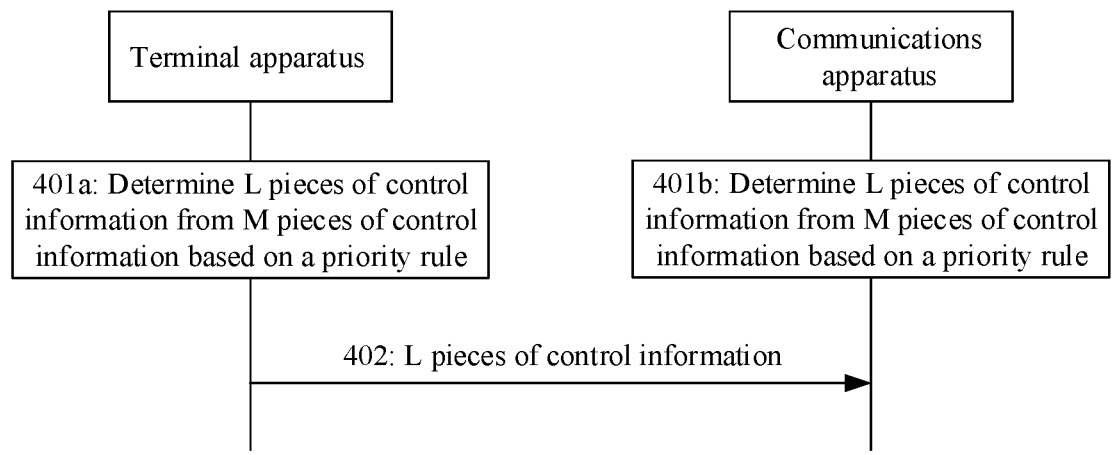
FIG. 4 is a schematic flowchart of a control information sending and receiving method.

FIG. 4 is a schematic flowchart of a control information sending and receiving method according to an embodiment of this application.

401a: A terminal apparatus determines L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M.

401b: A communications apparatus determines L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M.

402: The terminal apparatus sends the L pieces of control information. Correspondingly, the communications apparatus receives the L pieces of control information.

In this application, the communications apparatus may be a network apparatus, or may be a terminal apparatus.

In other words, based on the priority rule, the terminal apparatus does not select any control information or selects at least one piece of control information from the M pieces of control information that include at least one piece of sidelink control information. For example, when L is equal to 0, the terminal apparatus determines that there is no control information with a highest priority in the M pieces of control information, or that overheads of control information with a highest priority exceed a channel capacity, or that only some priority rules are used, and priorities of the M pieces of control information cannot be distinguished by using these priority rules. When L is equal to 1, the terminal apparatus may select control information with a highest priority from the M pieces of control information. For another example, when L is greater than 1, the terminal may select a plurality of pieces of control information with highest priorities from the M pieces of control information.

Optionally, priorities of the L pieces of control information are higher than priorities of M−L pieces of control information other than the L pieces of control information in the M pieces of control information.

Optionally, before determining the L pieces of control information from the M pieces of control information based on the priority rule, the terminal apparatus generates the M pieces of control information. In other words, the M pieces of control information may be to-be-sent control information.

The M pieces of control information include at least one piece of sidelink control information. The M pieces of control information may further include at least one piece of uplink control information.

The types of the M2 pieces of sidelink control information include at least one of an SL HARQ, an SL SR, sidelink aperiodic channel state information (SL a-CSI), sidelink semi-persistent channel state information (SL SP-CSI), sidelink periodic channel state information (SL p-CSI), sidelink beam related CSI, and sidelink non-beam related CSI. The sidelink non-beam related CSI includes sidelink rank related CSI and sidelink non-rank related CSI; and the sidelink non-rank related CSI further includes sidelink wideband CSI and sidelink sub-band CSI. In addition, sidelink layer 1 reference signal received power (SL L1-RSRP) belongs to the sidelink beam related CSI. Sidelink part 1 channel state information (SL part 1 CSI) belongs to the sidelink rank related CSI. Sidelink part 2 channel state information (SL part 2 CSI) belongs to the sidelink non-rank related CSI. Sidelink part 2 wideband channel state information (SL part 2 WB CSI) belongs to the sidelink wideband CSI. Sidelink part 2 sub-band channel state information (SL part 2 SB CSI) belongs to the sidelink sub-band CSI.

When M1 is greater than or equal to 1, the types of the M1 pieces of uplink control information (UCI) include at least one of an HARQ, an SR, aperiodic channel state information (a-CSI), semi-persistent channel state information (SP-CSI), periodic channel state information (P-CSI), beam related CSI, and non-beam related CSI. The non-beam related CSI includes rank related CSI and non-rank related CSI; and the non-rank related CSI further includes wideband CSI and sub-band CSI. In addition, layer 1 reference signal received power (L1-RSRP) belongs to the beam related CSI. Part 1 channel state information (1 CSI) belongs to the rank related CSI. Part 2 channel state information (part 2 CSI) belongs to the non-rank related CSI. Part 2 wideband channel state information (part 2 WB CSI) belongs to the wideband CSI. Part 2 sub-band channel state information (part 2 SB CSI) belongs to the sub-band CSI.

For example, the priority rule indicates a priority rule for different types of control information, and the M pieces of control information include two HARQs: an HARQ corresponding to a sidelink whose communication mode is broadcast and an HARQ corresponding to a sidelink whose communication mode is multicast. Based on the priority rule, it may be determined that L is equal to 0, that is, it is determined that the M pieces of control information do not include control information with a highest priority, and the M pieces of control information are not sent; it may be determined that L is equal to 1, that is, one piece of control information in the M pieces of control information is randomly determined as control information with a highest priority; or it may be determined that L is equal to 2, that is, it is determined that the two pieces of control information in the M pieces of control information have highest priorities.

The priority rule may be preconfigured, or may be dynamically configured. For example, the terminal apparatus stores an index table indicating the priority rule. For another example, the network apparatus dynamically sends a message, and the message carries information indicating the priority rule. This is not limited in this application.

Optionally, the priority rule may indicate a priority of control information in any form.

In an example, the priority rule may indicate a specific priority of control information. For example, the priority rule indicates that a priority of type 1 control information is high, a priority of type 2 control information is medium-high, a priority of type 3 control information is medium, and a priority of type 4 control information is low. For another example, the priority rule indicates that a priority of type 1 control information is 1, and a priority of type 2 control information is 2, where a smaller priority value indicates a higher priority.

In an example, the priority rule may indicate a comparison result of priorities of at least two different types of control information. For example, the priority rule indicates that a priority of type 1 control information is higher than a priority of type 2 control information, and the priority of the type 2 control information is higher than a priority of type 3 control information. In this case, the priority of the type 1 control information is higher than the priority of the type 3 control information.

In an example, the priority rule may indicate a sending sequence of at least two different types of control information. For example, the priority rule indicates that type 1 control information is to be sent before type 2 control information. For another example, the priority rule indicates that type 3 control information is to be sent after the type 2 control information.

The terminal apparatus may determine the L pieces of control information from the M pieces of control information based on the priority rule.

In an example, the terminal apparatus is to send four pieces of control information: type 1 control information, type 2 control information, type 3 control information, and type 4 control information, and the terminal apparatus determines one piece of control information with a highest priority in the four pieces of control information. When the priority rule indicates that a priority of the type 1 control information is high, a priority of the type 2 control information is medium-high, a priority of the type 3 control information is medium, and a priority of the type 4 control information is low, the terminal apparatus may determine that the type 1 control information has the highest priority.

In an example, the terminal apparatus is to send three pieces of control information: type 1 control information, type 2 control information, and type 3 control information, and the terminal apparatus determines two pieces of control information with highest priorities in the three pieces of control information. When the priority rule indicates that a priority of the type 1 control information is higher than a priority of the type 2 control information, and the priority of the type 2 control information is higher than a priority of the type 3 control information, the terminal apparatus may determine that the type 1 control information and the type 2 control information are the two pieces of control information with highest priorities.

In an example, the terminal apparatus is to send three pieces of control information: type 1 control information, type 2 control information, and type 3 control information, and the terminal apparatus determines one piece of control information with a highest priority in the three pieces of control information. When the priority rule indicates that the type 1 control information is to be sent before the type 2 control information, and the type 2 control information is to be sent before the type 3 control information, the terminal apparatus may determine that the type 1 control information has the highest priority, and preferably sends the type 1 control information.

Optionally, the priority rule is used to determine at least one of a priority rule for at least two types of control information, a priority rule for control information corresponding to at least two communication modes, and a priority rule for control information corresponding to at least two attributes. In other words, a plurality of pieces of control information may be distinguished from at least one perspective of types, corresponding communication modes, corresponding attributes, and the like, and different pieces of control information have different priorities. Prioritization of different pieces of control information in the priority rule may have any possible case.

Optionally, the at least two types of control information may include UCI and sidelink control information. The UCI may include an HARQ, an SR, CSI, and the like. The CSI may include at least one of a-CSI, SP-CSI, P-CSI, beam related CSI, non-beam related CSI, rank related CSI, non-rank related CSI, wideband CSI, and sub-band CSI. The sidelink control information may include an SL HARQ, an SL SR, SL CSI, and the like. The SL CSI may include at least one of SL a-CSI, SL SP-CSI, SL p-CSI, beam related CSI, sidelink non-beam related CSI, sidelink rank related CSI, sidelink non-rank related CSI, sidelink wideband CSI, and sidelink sub-band CSI. The priority rule for at least two types of control information may indicate, for example, a priority rule for at least two types of UCI and/or at least two types of sidelink control information.

Optionally, the priority rule for at least two types of control information may indicate any possible case.

Optionally, the priority rule for at least two types of control information includes at least one of the following priority rules:
 a priority of an HARQ is higher than a priority of CSI;
 a priority of an SR is higher than a priority of CSI;
 a priority of a-CSI is higher than a priority of SP-CSI;
 a priority of a-CSI is higher than a priority of P-CSI;
 a priority of SP-CSI is higher than a priority of P-CSI;
 a priority of beam related CSI is higher than a priority of non-beam related CSI;
 a priority of rank related channel state information is higher than a priority of non-rank related channel state information;
 a priority of wideband channel state information is higher than a priority of sub-band channel state information;
 a priority of L1-RSRP is higher than a priority of non-beam related CSI;
 a priority of part 1 CSI is higher than a priority of part 2 CSI;
 a priority of part 2 WB CSI is higher than a priority of part 2 SB CSI;
 a priority of an SL HARQ is higher than a priority of SL CSI;
 a priority of an SL SR is higher than a priority of SL CSI;
 a priority of SL a-CSI is higher than a priority of SL SP-CSI;
 a priority of SL a-CSI is higher than a priority of SL p-CSI;
 a priority of SL SP-CSI is higher than a priority of SL p-CSI;
 a priority of beam related CSI is higher than a priority of sidelink non-beam related CSI;
 a priority of sidelink rank related channel state information is higher than a priority of sidelink non-rank related channel state information;
 a priority of sidelink wideband channel state information is higher than a priority of sidelink sub-band channel state information;
 a priority of SL L1-RSRP is higher than a priority of sidelink non-beam related CSI;
 a priority of SL part 1 CSI is higher than a priority of SL part 2 CSI;
 a priority of SL part 2 WB CSI is higher than a priority of SL part 2 SB CSI; and
 a priority of UCI is higher than a priority of sidelink control information.

In an example, a priority sequence of at least two types of control information may be: SL HARQ/SL SR>SL a-CSI>SL SP-CSI>SL p-CSI>sidelink beam related CSI>sidelink rank related CSI>sidelink wideband CSI>sidelink sub-band CSI.

In an example, a priority sequence of at least two types of control information may be: SL HARQ/SL SR>SL a-CSI>SL SP-CSI>SL p-CSI>L1 RSRP>SL Part 1 CSI>SL Part 2 WB CSI>SL Part 2 SB CSI.

In an example, priorities of all types of UCI are higher than a priority of sidelink control information. For example, among all types of UCI, part 2 SB CSI has the lowest priority; among all types of sidelink control information, an SL HARQ has the highest priority; and the priority of part 2 SB CSI is higher than the priority of an SL HARQ.

In an example, priorities of some types of UCI are higher than the priority of sidelink control information.

For example, the priority of an HARQ is higher than the priority of an SL HARQ, the priority of an SR is higher than the priority of an SL SR, the priority of an SL HARQ is higher than the priority of CSI, the priority of an SR is higher than the priority of CSI, and the priority of CSI is higher than the priority of SL CSI.

For another example, the priority of a-CSI is higher than the priority of SL a-CSI, the priority of SL a-CSI is higher than the priority of SP-CSI, the priority of SP-CSI is higher than the priority of SL SP-CSI, the priority of SL SP-CSI is higher than the priority of P-CSI, and the priority of P-CSI is higher than the priority of SL p-CSI.

For another example, the priority of beam related CSI is higher than the priority of sidelink beam related CSI, the priority of sidelink beam related CSI is higher than the priority of non-beam related CSI, and the priority of non-beam related CSI is higher than the priority of sidelink non-beam related CSI.

For another example, the priority of rank related CSI is higher than the priority of sidelink rank related CSI, the priority of sidelink rank related CSI is higher than the priority of non-rank related CSI, and the priority of non-rank related CSI is higher than the priority of sidelink non-rank related CSI.

For another example, the priority of wideband CSI is higher than the priority of sidelink wideband CSI, the priority of sidelink wideband CSI is higher than the priority of sub-band CSI, and the priority of sub-band CSI is higher than the priority of sidelink sub-band CSI.

For another example, the priority of part 1 CSI is higher than the priority of SL part 1 CSI, the priority of SL part 1 CSI is higher than the priority of part 2 CSI, and the priority of part 2 CSI is higher than the priority of SL part 2 CSI.

For another example, the priority of part 2 WB CSI is higher than the priority of SL part 2 WB CSI, the priority of SL part 2 WB CSI is higher than the priority of part 2 SB CSI, and the priority of part 2 SB CSI is higher than the priority of SL part 2 SB CSI.

For another example, the priority of a-CSI is higher than the priority of an SL HARQ or an SL SR, and the priority of an SL HARQ or an SL SR is higher than the priority of SP-CSI.

For another example, the priority of SP-CSI is higher than the priority of an SL HARQ or an SL SR, and the priority of an SL HARQ or an SL SR is higher than the priority of P-CSI.

For another example, the priority of P-CSI is higher than the priority of an SL HARQ or an SL SR, and the priority of an SL HARQ or an SL SR is higher than the priority of beam related CSI.

For another example, the priority of beam related CSI is higher than the priority of an SL HARQ or an SL SR, and the priority of an SL HARQ or an SL SR is higher than the priority of non-beam related CSI.

Optionally, that a priority of control information corresponding to an uplink attribute is higher than a priority of control information corresponding to a sidelink attribute includes at least one of the following priority rules:
- a priority of an HARQ is higher than a priority of an SL HARQ;
- a priority of an SR is higher than a priority of an SL SR;
- a priority of CSI is higher than a priority of SL CSI;
- a priority of a-CSI is higher than a priority of SL a-CSI;
- a priority of SP-CSI is higher than a priority of SL SP-CSI;
- a priority of P-CSI is higher than a priority of SL p-CSI;
- a priority of beam related CSI is higher than a priority of sidelink beam related CSI;
- a priority of non-beam related CSI is higher than a priority of sidelink non-beam related CSI;
- a priority of rank related CSI is higher than a priority of sidelink rank related CSI;
- a priority of non-rank related CSI is higher than a priority of sidelink non-rank related CSI;
- a priority of wideband CSI is higher than a priority of sidelink wideband CSI;
- a priority of sub-band CSI is higher than a priority of sidelink sub-band CSI;
- a priority of L1 RSRP is higher than a priority of SL L1 RSRP;
- a priority of part 1 CSI is higher than a priority of SL part 1 CSI;
- a priority of part 2 CSI is higher than a priority of SL part 2 CSI;
- a priority of part 2 WB CSI is higher than a priority of SL part 2 WB CSI;
- a priority of part 2 SB CSI is higher than a priority of SL part 2 SB CSI;

In an example, a priority rule for at least two types of control information corresponding to uplink and sidelink attributes may be as follows: HARQ/SR>SL HARQ/SL SR>a-CSI>SL a-CSI>SP-CSI>SL SP-CSI>p-CSI>SL p-CSI>beam related CSI>sidelink beam related CSI>rank related CSI>sidelink rank related CSI>wideband CSI>sidelink wideband CSI>sub-band CSI>sidelink sub-band CSI.

In an example, the priority rule for at least two types of control information corresponding to uplink and sidelink attributes may be as follows: HARQ/SR>SL HARQ/SL SR>a-CSI>SL a-CSI>SP-CSI>SL SP-CSI>p-CSI>SL p-CSI>L1 RSRP>SL L1 RSRP>Part 1 CSI>SL Part 1 CSI>Part 2 WB CSI>SL Part 2 WB CSI>Part 2 SB CSI>SL Part 2 SB CSI.

In an example, the priority rule for at least two types of control information corresponding to uplink and sidelink attributes may be as follows: HARQ/SR>a-CSI>SP-CSI>p-CSI>beam related CSI>rank related CSI>wideband CSI>sub-band CSI>SL HARQ/SL SR>SL a-CSI>SL SP-CSI>SL p-CSI>sidelink beam related CSI>sidelink rank related CSI>sidelink wideband CSI>sidelink sub-band CSI.

In an example, the priority rule for at least two types of control information corresponding to uplink and sidelink attributes may be as follows: HARQ/SR>a-CSI>SP-CSI>p-CSI>L1 RSRP>Part 1 CSI>Part 2 WB CSI>Part 2 SB CSI>SL HARQ/SL SR>SL a-CSI>SL SP-CSI>SL p-CSI>SL L1 RSRP>SL Part 1 CSI>SL Part 2 WB CSI>SL Part 2 SB CSI.

Optionally, the control information corresponding to at least two communication modes may include sidelink control information corresponding to an uplink/downlink or a sidelink whose communication mode is broadcast, sidelink control information corresponding to an uplink/downlink or a sidelink whose communication mode is multicast, and sidelink control information corresponding to an uplink/downlink or a sidelink whose communication mode is unicast. For example, CSI generated by performing channel estimation on the uplink/downlink or the sidelink whose communication mode is broadcast is the sidelink control information corresponding to the uplink/downlink or the sidelink whose communication mode is broadcast. The priority rule for control information corresponding to at least two communication modes may indicate, for example, a priority sequence of sidelink control information corresponding to uplinks/downlinks or sidelinks whose communication modes are broadcast, multicast, and/or unicast.

Optionally, the priority rule for control information corresponding to at least two communication modes may indicate any possible case.

Optionally, the priority rule for control information corresponding to at least two communication modes includes at least one of the following priority rules:
- a priority of sidelink control information corresponding to a sidelink whose communication mode is broadcast is higher than a priority of sidelink control information corresponding to a sidelink whose communication mode is multicast;
- a priority of sidelink control information corresponding to a sidelink whose communication mode is broadcast is higher than a priority of sidelink control information corresponding to a sidelink whose communication mode is unicast; and
- a priority of sidelink control information corresponding to a sidelink whose communication mode is multicast is higher than a priority of sidelink control information corresponding to a sidelink whose communication mode is unicast.

Optionally, the priority rule for control information corresponding to at least two communication modes includes at least one of the following priority rules:

a priority of sidelink control information corresponding to a sidelink whose communication mode is broadcast is lower than a priority of sidelink control information corresponding to a sidelink whose communication mode is multicast;

a priority of sidelink control information corresponding to a sidelink whose communication mode is broadcast is lower than a priority of sidelink control information corresponding to a sidelink whose communication mode is unicast; and a priority of sidelink control information corresponding to a sidelink whose communication mode is multicast is lower than a priority of sidelink control information corresponding to a sidelink whose communication mode is unicast.

In an example, when types of sidelink control information are the same and/or some attributes of the sidelink control information are the same, a priority of sidelink control information corresponding to a sidelink whose communication mode is broadcast is higher than a priority of sidelink control information corresponding to a sidelink whose communication mode is multicast, and a priority of sidelink control information corresponding to a sidelink whose communication mode is multicast is higher than a priority of sidelink control information corresponding to a sidelink whose communication mode is unicast. The some attributes may include a cell number of a corresponding cell, a corresponding CSI configuration identifier, and the like. For example, types of control information 1 and control information 2 are both SL a-CSI, a communication mode of a sidelink corresponding to the control information 1 is broadcast, and a communication mode of a sidelink corresponding to the control information 2 is multicast. In this case, a priority of the control information 1 is higher than a priority of the control information 2. For another example, types of control information 1 and control information 2 are both SL a-CSI, a cell number of a cell corresponding to the control information 1 is the same as a cell number of a cell corresponding to the control information 2, a communication mode of a sidelink corresponding to the control information 1 is broadcast, and a communication mode of a sidelink corresponding to the control information 2 is multicast. In this case, a priority of the control information 1 is higher than a priority of the control information 2.

Optionally, the control information corresponding to at least two attributes may include sidelink control information corresponding to different cells, sidelink control information corresponding to different CSI configuration identifiers, control information corresponding to different sending link numbers, control information corresponding to an uplink attribute, control information corresponding to a sidelink attribute, and the like. For example, CSI generated by performing channel estimation on a cell 1 is sidelink control information corresponding to the cell 1. For another example, control information that belongs to UCI is control information corresponding to an uplink attribute. For another example, control information that belongs to sidelink control information is control information corresponding to a sidelink attribute. The priority rule for control information corresponding to at least two attributes indicates, for example, priorities of UCI and/or sidelink control information corresponding to different cells, different CSI configuration identifiers, different sending link numbers, and/or different attributes.

The priority rule for control information corresponding to at least two attributes may indicate any possible case. For example, prioritization of UCI and sidelink control information may have any possible case.

Optionally, the priority rule for control information corresponding to at least two attributes includes at least one of the following priority rules:

a priority of UCI corresponding to a cell with a smaller cell number is higher than a priority of UCI corresponding to a cell with a larger cell number;

a priority of sidelink control information corresponding to a cell with a smaller cell number is higher than a priority of sidelink control information corresponding to a cell with a larger cell number;

a priority of UCI corresponding to a smaller CSI configuration identifier is higher than a priority of UCI corresponding to a larger CSI configuration identifier;

a priority of sidelink control information corresponding to a smaller CSI configuration identifier is higher than a priority of sidelink control information corresponding to a larger CSI configuration identifier; and a priority of control information corresponding to a smaller sending link number is higher than a priority of control information corresponding to a larger sending link number.

Optionally, the priority rule for control information corresponding to at least two attributes includes at least one of the following priority rules:

a priority of UCI corresponding to a cell with a smaller cell number is lower than a priority of UCI corresponding to a cell with a larger cell number;

a priority of sidelink control information corresponding to a cell with a smaller cell number is lower than a priority of sidelink control information corresponding to a cell with a larger cell number;

a priority of UCI corresponding to a smaller CSI configuration identifier is lower than a priority of UCI corresponding to a larger CSI configuration identifier;

a priority of sidelink control information corresponding to a smaller CSI configuration identifier is lower than a priority of sidelink control information corresponding to a larger CSI configuration identifier; and a priority of control information corresponding to a smaller sending link number is lower than a priority of control information corresponding to a larger sending link number.

In an example, when types of some pieces of sidelink control information are the same, a priority of sidelink control information corresponding to a cell with a smaller cell number is higher than a priority of sidelink control information corresponding to a cell with a larger cell number, and a priority of sidelink control information corresponding to a smaller CSI configuration identifier is higher than a priority of sidelink control information corresponding to a larger CSI configuration identifier. The types may include at least one of the following: an SL HARQ, an SL SR, SL a-CSI, SL SP-CSI, SL p-CSI, sidelink beam related CSI, and sidelink non-beam related CSI. For example, types of control information 1 and control information 2 are both a-CSI, a cell number of a cell corresponding to the control information 1 is 1, and a cell number of a cell corresponding to the control information 2 is 2. In this case, a priority of the control information 1 is higher than a priority of the control information 2. For another example, types of control information 1 and control information 2 are both SL a-CSI, a cell number of a cell corresponding to the control information 1 is 2, a cell number of a cell corresponding to the control information 2 is 2, a CSI configuration identifier corresponding to the control information 1 is 1, and a CSI configuration identifier corresponding to the control information 2 is 2. In this case, a priority of the control information 1 is higher than a priority of the control information 2.

In an example, when types of sidelink control information are the same and sending manners of the sidelink control information are the same, a priority of sidelink control information corresponding to a smaller sending link number is higher than a priority of sidelink control information corresponding to a larger sending link number. For example, types of control information 1 and control information 2 are both SL a-CSI, a communication mode of a sidelink corresponding to the control information 1 is broadcast, a communication mode of a sidelink corresponding to the control information 2 is broadcast, a sending link number corresponding to the control information 1 is 1, and a sending link number corresponding to the control information 2 is 2. In this case, a priority of the control information 1 is higher than a priority of the control information 2.

In an example, when types of UCI are the same, a priority of UCI corresponding to a smaller sending link number is higher than a priority of UCI corresponding to a larger sending link number. For example, types of control information 1 and control information 2 are both a-CSI, a sending link number corresponding to the control information 1 is 1, and a sending link number corresponding to the control information 2 is 2. In this case, a priority of the control information 1 is higher than a priority of the control information 2. Optionally, the priority rule for control information corresponding to at least two attributes may further include a priority rule for control information carried on different channels.

The priority rule for control information corresponding to at least two attributes may include: a priority rule for control information carried on different channels such as a PUSCH and a PUCCH, and/or a priority rule for sidelink control information carried on different channels such as a PUSCH, a PUCCH, a PSSCH, and a PSCCH.

The priority rule for control information corresponding to at least two attributes may indicate any possible case.

Optionally, the priority rule for control information corresponding to at least two attributes includes at least one of the following priority rules:
a priority of sidelink control information carried on a PSCCH is lower than a priority of sidelink control information carried on a PUCCH; and
a priority of sidelink control information carried on a PSSCH is lower than a priority of sidelink control information carried on a PUSCH.

Optionally, the priority rule for control information corresponding to at least two attributes includes at least one of the following priority rules:
a priority of sidelink control information carried on a PUSCH is lower than a priority of sidelink control information carried on a PUCCH; and
a priority of sidelink control information carried on a PSSCH is lower than a priority of sidelink control information carried on a PSCCH.

Optionally, the priority rule for control information corresponding to at least two attributes includes at least one of the following priority rules:
a priority of sidelink control information carried on a PUSCH is higher than a priority of sidelink control information carried on a PUCCH; and
a priority of sidelink control information carried on a PSSCH is higher than a priority of sidelink control information carried on a PSCCH.

In an example, when types of sidelink control information are the same and/or some attributes of the sidelink control information are the same, a priority of sidelink control information carried on a PUSCH is higher than a priority of sidelink control information carried on a PUCCH, the priority of sidelink control information carried on a PUCCH is higher than a priority of sidelink control information carried on a PSSCH, and the priority of sidelink control information carried on a PSSCH is higher than a priority of sidelink control information carried on a PSCCH. The some attributes may include a cell number, a CSI configuration identifier, and the like. For example, types of control information 1 and control information 2 are both SL a-CSI, a cell number of a cell corresponding to the control information 1 is 1, a cell number of a cell corresponding to the control information 2 is 1, the control information 1 is carried on a PUSCH, and the control information 2 is carried on a PUCCH. In this case, a priority of the control information 1 is higher than a priority of the control information 2.

Optionally, that a terminal apparatus determines L pieces of control information from M pieces of control information based on a priority rule includes: determining the L pieces of control information based on the priority rule and the channel capacity, where a total quantity of bits of the L pieces of control information is less than or equal to the channel capacity.

Optionally, less than L pieces of control information may be sent. Although the channel capacity is not fully used, less information is transmitted by using more resources, so that a lower-order modulation scheme and/or a lower bit rate can be used to improve an information transmission success rate.

Optionally, before the determining L pieces of control information from M pieces of control information based on a priority rule, the method further includes: The terminal apparatus determines the channel capacity.

Optionally, that the terminal apparatus sends the L pieces of control information includes: The terminal apparatus sends the L pieces of control information on the channel.

In other words, the channel capacity is first determined before the L pieces of control information are determined, and the L pieces of control information whose total overheads or total quantity of bits are/is less than the channel capacity are determined based on the channel capacity. In some cases, time-frequency resources occupied by the L pieces of control information do not overlap time-frequency resources occupied by information or a message other than the L pieces of control information. The M pieces of control information include control information 1 whose bit quantity is 0.3 megabits, control information 2 whose bit quantity is 0.4 megabits, and control information 3 whose bit quantity is 0.4 megabits, where a priority of the control information 1 is higher than a priority of the control information 2, and the priority of the control information 2 is higher than a priority of the control information 3. Based on the priority rule, it may be determined that the control information 1, or the control information 1 and the control information 2 are the L pieces of control information, and the L pieces of control information further satisfy that the total quantity of bits is less than the channel capacity.

Optionally, a total quantity of bits of L+1 pieces of control information in the M pieces of control information is greater than the channel capacity, and priorities of the L+1 pieces of control information are higher than priorities of M−L−1 pieces of control information in the M pieces of control information other than the L+1 pieces of control information.

In other words, total overheads or a total quantity of bits of the L pieces of control information with highest priorities in the M pieces of control information is just less than the channel capacity, and total overheads or a total quantity of bits of L+1 pieces of control information with highest priorities in the M pieces of control information is just greater than the channel capacity. For example, a total quantity of bits of the channel capacity is 1 megabit, and the M pieces of control information include control information 1 whose bit quantity is 0.3 megabits, control information 2 whose bit quantity is 0.4 megabits, and control information 3 whose bit quantity is 0.4 megabits, where a priority of the control information 1 is higher than a priority of the control information 2, and the priority of the control information 2 is higher than a priority of the control information 3. Based on the priority rule, it may be determined that the control information 1 and the control information 2 are the L pieces of control information. In this case, a total quantity of bits of the L pieces of control information is less than the channel capacity, and a total quantity of bits of L+1 pieces of control information with highest priorities in the M pieces of control information is greater than the channel capacity.

Optionally, a total quantity of bits of the M pieces of control information is greater than the channel capacity.

In other words, when the total quantity of bits of the M pieces of control information is greater than the channel capacity, L is less than M, that is, some of the M pieces of control information are sent. For example, if a total quantity of bits of the channel capacity is 1 megabit, and the M pieces of control information include control information 1 whose bit quantity is 0.3 megabits, control information 2 whose bit quantity is 0.4 megabits, and control information 3 whose bit quantity is 0.4 megabits, a total quantity of bits of the M pieces of control information is greater than the channel capacity.

Optionally, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: The terminal apparatus determines a priority sequence of the M pieces of control information based on the N1 priority sub-rules; and determines the L pieces of control information from the M pieces of control information based on the priority sequence of the M pieces of control information.

The N priority sub-rules may include at least one of the priority rule for at least two types of control information, the priority rule for control information corresponding to at least two communication modes, and the priority rule for control information corresponding to at least two attributes.

In an example, the N priority sub-rules may include at least one of the following priority rules: A priority of an HARQ is higher than a priority of CSI; a priority of an SR is higher than a priority of CSI; a priority of a-CSI is higher than a priority of SP-CSI; a priority of a-CSI is higher than a priority of P-CSI; a priority of SP-CSI is higher than a priority of P-CSI; a priority of beam related CSI is higher than a priority of non-beam related CSI; a priority of rank related channel state information is higher than a priority of non-rank related channel state information; a priority of wideband channel state information is higher than a priority of sub-band channel state information; a priority of L1-RSRP is higher than a priority of non-beam related CSI; a priority of part 1 CSI is higher than a priority of part 2 CSI; a priority of part 2 WB CSI is higher than a priority of part 2 SB CSI; a priority of an SL HARQ is higher than a priority of SL CSI; a priority of an SL SR is higher than a priority of SL CSI; a priority of SL a-CSI is higher than a priority of SL SP-CSI; a priority of SL a-CSI is higher than a priority of SL p-CSI; a priority of SL SP-CSI is higher than a priority of SL p-CSI; a priority of beam related CSI is higher than a priority of sidelink non-beam related CSI; a priority of sidelink rank related channel state information is higher than a priority of sidelink non-rank related channel state information; a priority of sidelink wideband channel state information is higher than a priority of sidelink sub-band channel state information; a priority of SL L1-RSRP is higher than a priority of sidelink non-beam related CSI; a priority of SL part 1 CSI is higher than a priority of SL part 2 CSI; a priority of SL part 2 WB CSI is higher than a priority of SL part 2 SB CSI; and a priority of UCI is higher than a priority of sidelink control information.

Optionally, the priority rule includes N priority sub-rules, and priorities of N1 priority sub-rules in the N priority sub-rules are higher than priorities of N−N1 priority sub-rules in the N priority sub-rules other than the N1 priority sub-rules, N1 is a positive integer greater than or equal to 1 and less than or equal to N, and N is a positive integer greater than or equal to 2. The determining L pieces of control information from M pieces of control information based on a priority rule includes: determining a priority sequence of the M pieces of control information first based on the N1 priority sub-rules and then based on the N−N1 priority sub-rules; and determining the L pieces of control information from the M pieces of control information based on the priority sequence of the M pieces of control information.

In an example, the N priority sub-rules may include at least one of the following priority rules: A priority of sidelink control information corresponding to a sidelink whose communication mode is broadcast is higher than a priority of sidelink control information corresponding to a sidelink whose communication mode is multicast; a priority of sidelink control information corresponding to a sidelink whose communication mode is broadcast is higher than a priority of sidelink control information corresponding to a sidelink whose communication mode is unicast; and a priority of sidelink control information corresponding to a sidelink whose communication mode is multicast is higher than a priority of sidelink control information corresponding to a sidelink whose communication mode is unicast.

In an example, the N priority sub-rules may include at least one of the following priority rules: A priority of UCI corresponding to a cell with a smaller cell number is higher than a priority of UCI corresponding to a cell with a larger cell number; a priority of sidelink control information corresponding to a cell with a smaller cell number is higher than a priority of sidelink control information corresponding to a cell with a larger cell number; a priority of UCI corresponding to a smaller CSI configuration identifier is higher than a priority of UCI corresponding to a larger CSI configuration identifier; a priority of sidelink control information corresponding to a smaller CSI configuration identifier is higher than a priority of sidelink control information corresponding to a larger CSI configuration identifier; and a priority of control information corresponding to a smaller sending link number is higher than a priority of control information corresponding to a larger sending link number.

In an example, the N priority sub-rules may include at least one of the following priority rules: A priority of an HARQ is higher than a priority of an SL HARQ; a priority of an SR is higher than a priority of an SL SR; a priority of CSI is higher than a priority of SL CSI; a priority of a-CSI is higher than a priority of SL a-CSI; a priority of SP-CSI is higher than a priority of SL SP-CSI; a priority of P-CSI is higher than a priority of SL p-CSI; a priority of beam related CSI is higher than a priority of sidelink beam related CSI; a priority of non-beam related CSI is higher than a priority of sidelink non-beam related CSI; a priority of rank related CSI is higher than a priority of sidelink rank related CSI; a priority of non-rank related CSI is higher than a priority of sidelink non-rank related CSI; a priority of wideband CSI is higher than a priority of sidelink wideband CSI; a priority of sub-band CSI is higher than a priority of sidelink sub-band CSI; a priority of L1 RSRP is higher than a priority of SL L1 RSRP; a priority of part 1 CSI is higher than a priority of SL part 1 CSI; a priority of part 2 CSI is higher than a priority of SL part 2 CSI; a priority of part 2 WB CSI is higher than a priority of SL part 2 WB CSI; and a priority of part 2 SB CSI is higher than a priority of SL part 2 SB CSI.

In an example, the N priority sub-rules may include at least one of the following priority rules: A priority of sidelink control information carried on a PSCCH is lower than a priority of sidelink control information carried on a PUCCH; and a priority of sidelink control information carried on a PSSCH is lower than a priority of sidelink control information carried on a PUSCH.

In an example, the N priority sub-rules may include at least one of the following priority rules: A priority of sidelink control information carried on a PUSCH is lower than a priority of sidelink control information carried on a PUCCH; and a priority of sidelink control information carried on a PSSCH is lower than a priority of sidelink control information carried on a PSCCH.

In an example, the N priority sub-rules may include at least one of the following priority rules: A priority of sidelink control information carried on a PUSCH is higher than a priority of sidelink control information carried on a PUCCH; and a priority of sidelink control information carried on a PSSCH is higher than a priority of sidelink control information carried on a PSCCH.

For example, N is 2, and the N priority sub-rules include a priority sub-rule 1: a priority of an SL HARQ or an SL SR is higher than a priority of SL CSI, and a priority sub-rule 2: a priority of sidelink control information corresponding to a sidelink whose communication mode is broadcast is higher than a priority of sidelink control information corresponding to a sidelink whose communication mode is broadcast.

The priority sub-rule 1 and the priority sub-rule 2 are used as an example. It is assumed that the M pieces of control information include an SL HARQ corresponding to a sidelink whose communication mode is broadcast, an SL HARQ corresponding to a sidelink whose communication mode is multicast, SL CSI corresponding to a sidelink whose communication mode is broadcast, and SL CSI corresponding to a sidelink whose communication mode is multicast. Based on the priority sub-rule 1 and the priority sub-rule 2, the terminal cannot determine which one of a priority of the SL HARQ corresponding to a sidelink whose communication mode is multicast and a priority of SL CSI corresponding to a sidelink whose communication mode is broadcast is higher, and needs to perform determining based on priorities of the priority sub-rule 1 and the priority sub-rule 2. It is assumed that the priority of the priority sub-rule 1 is higher than the priority of the priority sub-rule 2. In this case, the terminal determines, based on the priority sub-rule 1, that both a priority of the SL HARQ corresponding to a sidelink whose communication mode is broadcast and the priority of the SL HARQ corresponding to a sidelink whose communication mode is multicast are higher than the priority of the SL CSI corresponding to a sidelink whose communication mode is broadcast and a priority of SL CSI corresponding to a sidelink whose communication mode is multicast; and then the terminal determines, based on the priority sub-rule 2, that the priority of the SL HARQ corresponding to a sidelink whose communication mode is broadcast is higher than the priority of the SL HARQ corresponding to a sidelink whose communication mode is multicast, and the priority of the SL CSI corresponding to a sidelink whose communication mode is broadcast is higher than the priority of the SL CSI corresponding to a sidelink whose communication mode is multicast.

Assuming that L is equal to 1, the terminal apparatus determines, based on the priority sub-rule 1 and the priority sub-rule 2, that the SL HARQ corresponding to a sidelink whose communication mode is broadcast has the highest priority, and the L pieces of control information are the SL HARQ corresponding to a sidelink whose communication mode is broadcast.

In some cases, the L pieces of control information may be determined based on only a priority sub-rule with a higher priority. The terminal apparatus does not need to determine the L pieces of control information based on a priority sub-rule with a lower priority. In other words, the terminal apparatus may determine the L pieces of control information based on only some of the N priority sub-rules in a priority sequence of the priority sub-rules.

Assuming that L is equal to 2, the terminal apparatus may determine, based on only the priority sub-rule 1, that the SL HARQ corresponding to a sidelink whose communication mode is broadcast and the SL HARQ corresponding to a sidelink whose communication mode is multicast are two pieces of control information with highest priorities in the M pieces of control information, and the L pieces of control information are the SL HARQ corresponding to a sidelink whose communication mode is broadcast and the SL HARQ corresponding to a sidelink whose communication mode is multicast.

Optionally, a priority of a priority sub-rule of the priority rule for at least two types of control information is higher than a priority of a priority sub-rule of the priority rule for control information corresponding to at least two communication modes.

Optionally, a priority of a priority sub-rule of the priority rule for at least two types of control information is higher than a priority of a priority sub-rule of the priority rule for control information corresponding to at least two attributes.

Optionally, a priority of a priority sub-rule of the priority rule for control information corresponding to at least two attributes is higher than a priority of a priority sub-rule of the priority rule for at least two types of control information.

Optionally, a priority of a priority sub-rule of the priority rule for control information corresponding to at least two attributes is higher than a priority of a priority sub-rule of the priority rule for control information corresponding to at least two communication modes.

Optionally, a priority of a priority sub-rule of the priority rule for control information corresponding to at least two communication modes is higher than a priority of a priority sub-rule of the priority rule for control information corresponding to at least two attributes.

In an example, a priority sub-rule A is that a priority of sidelink beam related CSI is higher than a priority of sidelink non-beam related CSI; a priority sub-rule B is that a priority of sidelink rank related CSI is higher than a priority of sidelink non-rank related CSI; and a priority sub-rule C is that a priority of sidelink control information corresponding to a cell with a smaller cell number is higher than a priority of sidelink control information corresponding to a cell with a larger cell number. A priority of the priority sub-rule A is higher than a priority of the priority sub-rule C, and the priority of the priority sub-rule C is higher than a priority of the priority sub-rule B. In other words, whether beams are related is first determined, then cell numbers are compared, and finally whether ranks are related is determined. That is, a priority of non-rank related CSI corresponding to a cell with a smaller cell number is higher than a priority of rank related CSI corresponding to a cell with a larger cell number.

In an example, a priority sub-rule D is that a priority of sidelink control information corresponding to a cell with a smaller cell number is higher than a priority of sidelink control information corresponding to a cell with a larger cell number, and a priority sub-rule E is that a priority of sidelink control information corresponding to a smaller CSI configuration identifier is higher than a priority of sidelink control information corresponding to a larger CSI configuration identifier. A priority of the priority sub-rule D is higher than a priority of the priority sub-rule E. In other words, values of cell numbers are first compared, and then values of CSI configuration identifiers are compared. That is, a priority of non-beam related CSI corresponding to a cell with a smaller cell number and corresponding to a larger CSI configuration identifier is higher than a priority of non-beam related CSI corresponding to a cell with a larger cell number and corresponding to a smaller CSI configuration identifier.

In an example, a priority sub-rule F is that a priority of control information corresponding to a smaller sending link number is higher than a priority of control information corresponding to a larger sending link number. A priority sub-rule G is that a priority of sidelink control information corresponding to a sidelink whose communication mode is broadcast is higher than a priority of sidelink control information corresponding to a sidelink whose communication mode is multicast. A priority of the priority sub-rule F is lower than a priority of the priority sub-rule G. In other words, a priority of sidelink control information corresponding to a sidelink whose communication mode is broadcast and corresponding to a larger sending link number is higher than a priority of sidelink control information corresponding to a sidelink whose communication mode is multicast and corresponding to a smaller sending link number.

For example, M is equal to 5, N is equal to 3, and L is equal to 2. The M pieces of control information include an HARQ, SL CSI-1, an SL HARQ, CSI, and SL CSI-2, and cell numbers of cells corresponding to the SL CSI-1, the SL HARQ, and the SL CSI-2 are respectively 1, 2, and 2. The N priority sub-rules include a priority sub-rule 1: a priority of a hybrid automatic repeat request is higher than a priority of channel state information, a priority sub-rule 2: a priority of sidelink control information corresponding to a cell with a smaller cell number is higher than a priority of sidelink control information corresponding to a cell with a larger cell number, and a priority sub-rule 3: a priority of control information corresponding to an uplink attribute is higher than a priority of control information corresponding to a sidelink attribute. A priority of the priority sub-rule 1 is higher than a priority of the priority sub-rule 2, and the priority of the priority sub-rule 2 is higher than a priority of the priority sub-rule 3. The terminal apparatus may determine, based on only the priority sub-rule 1, that a priority sequence of the M pieces of control information is: the HARQ, the SL HARQ, the CSI, the SL CSI-1 and the SL CSI-2. In this case, the L pieces of control information are the HARQ and the SL HARQ.

Optionally, that the terminal apparatus determines the L pieces of control information from the M pieces of control information based on the N1 priority sub-rules and a priority sequence of the N1 priority sub-rules includes the following steps.

Step a: Determine that i=1, where i is a cyclic parameter.

Step b: Determine a priority sub-rule whose priority sequence number is i in the N1 priority sub-rules.

Step c: Determine Ti pieces of condition control information based on the priority sub-rule whose priority sequence number is i, where Ti is a positive integer greater than or equal to 0, and when Ti is greater than or equal to 1, the L pieces of control information include at least one piece of control information of the Ti pieces of condition control information.

Step d: Determine, based on T1 to Ti pieces of condition control information, whether the L pieces of control information can be determined, and if no, determine that a current value of i plus 1 is a new value of i, and return to step b; or if yes, determine the L pieces of control information.

In other words, the terminal apparatus may rank the N1 priority sub-rules in descending order of priorities, and determine the L pieces of control information based on the N1 priority sub-rules one by one.

In an example, the M pieces of control information include the following eight pieces of control information:

TABLE 1

Eight different pieces of control information

| Control information | Type | Attribute | Communication Mode |
|---|---|---|---|
| 1 | 1 | 1 | 1 |
| 2 | 1 | 1 | 2 |
| 3 | 1 | 2 | 1 |
| 4 | 1 | 2 | 2 |
| 5 | 2 | 1 | 1 |
| 6 | 2 | 1 | 2 |
| 7 | 2 | 2 | 1 |
| 8 | 2 | 2 | 2 |

Sub-rule 1: A priority of control information of the type 1 is higher than a priority of control information of the type 2.

Sub-rule 2: A priority of control information corresponding to the attribute 1 is higher than a priority of control information corresponding to the attribute 2.

Sub-rule 3: A priority of control information corresponding to a sidelink in the communication mode 1 is higher than a priority of control information corresponding to a sidelink in the communication mode 2.

A priority of the sub-rule 1 is higher than a priority of the sub-rule 2, and the priority of the sub-rule 2 is higher than a priority of the sub-rule 3.

(1) It is assumed that L is equal to 1:

Step 1: i=1, the terminal apparatus may determine, based on the sub-rule 1, that the control information 1 to the control information 4 whose types are 1 are four pieces of control information with highest priorities in the M pieces of control information, that is, T1 pieces of condition control information are the control information 1 to the control information 4, and T1 is equal to 4. In this case, the terminal apparatus cannot determine the L pieces of control information.

Step 2: i=2, the terminal apparatus may determine, based on the sub-rule 2, that the control information 1 and the control information 2 whose types are 1 and whose attributes are 1 are two pieces of control information with highest priorities in the M pieces of control information, that is, T2 pieces of condition control information are the control information 1 and the control information 2, and T2 is equal to 2. In this case, the terminal apparatus cannot determine the L pieces of control information.

Step 3: i=3, the terminal apparatus may determine, based on the sub-rule 3, that the control information 1 whose type is 1, attribute is 1, and sending mode is 1 is one piece of control information with the highest priority in the M pieces of control information, that is, T3 pieces of condition control information are the control information 1, and T3 is equal to 1. In this case, the terminal apparatus can determine that the L pieces of control information are the control information 1.

(2) It is assumed that L is equal to 2:

Step 1: i=1, the terminal apparatus may determine, based on the sub-rule 1, that the control information 1 to the control information 4 whose types are 1 are four pieces of control information with highest priorities in the M pieces of control information, that is, T1 pieces of condition control information are the control information 1 to the control information 4, and T1 is equal to 4. In this case, the terminal apparatus cannot determine the L pieces of control information.

Step 2: i=2, the terminal apparatus may determine, based on the sub-rule 2, that the control information 1 and the control information 2 whose types are 1 and whose attributes are 1 are two pieces of control information with highest priorities in the M pieces of control information, that is, T2 pieces of condition control information are the control information 1 and the control information 2, and T2 is equal to 2. In this case, the terminal apparatus can determine that the L pieces of control information are the control information 1 and the control information 2.

(3) It is assumed that L is equal to 5:

Step 1: i=1, the terminal apparatus may determine, based on the sub-rule 1, that the control information 1 to the control information 4 whose types are 1 are four pieces of control information with highest priorities in the M pieces of control information, that is, T1 pieces of condition control information are the control information 1 to the control information 4, and T1 is equal to 4. In this case, the terminal apparatus cannot determine the L pieces of control information.

Step 2: i=2, the terminal apparatus may determine, based on the sub-rule 2, that the control information 5 and the control information 6 whose types are 2 and whose attributes are 1 are two pieces of control information with highest priorities in the M pieces of control information other than the control information 1 to the control information 4, that is, T2 pieces of condition control information are the control information 5 and the control information 6, and T2 is equal to 2. In this case, the terminal apparatus cannot determine the L pieces of control information.

Step 3: i=3, the terminal apparatus may determine, based on the sub-rule 3, that the control information 5 whose type is 2, attribute is 1, and sending mode is 1 is one piece of control information with the highest priority in the M pieces of control information other than the control information 1 to the control information 4, that is, T3 pieces of condition control information are the control information 5, and T3 is equal to 1. In this case, the terminal apparatus can determine that the L pieces of control information are the control information 1 to the control information 5.

Optionally, the priority rule includes a priority sequence of S pieces of control information corresponding to at least two types, at least two communication modes, and/or at least two attributes, priorities of S1 pieces of control information in the S pieces of control information are higher than priorities of S-S1 pieces of control information other than the S1 pieces of control information in the S pieces of control information, S1 is a positive integer greater than or equal to 1 and less than or equal to S, and S is a positive integer greater than or equal to 2. The determining L pieces of control information from M pieces of control information based on a priority rule includes: determining the L pieces of control information with highest priorities in the M pieces of control information based on a priority sequence of the S1 pieces of control information.

In other words, the priority rule includes the priority sequence of the S different pieces of control information. The L pieces of control information are determined based on the priority sequence of the S1 pieces of control information with highest priorities in the S pieces of control information. For example, a priority sequence number of control information of the type 1 and corresponding to the attribute 1 is 1, a priority sequence number of control information of the type 1 and corresponding to the attribute 2 is 2, a priority sequence number of control information of the type 2 and corresponding to the attribute 1 is 3, and a priority sequence number of control information of the type 2 and corresponding to the attribute 2 is 4.

Optionally, that a terminal determines L pieces of control information from M pieces of control information based on a priority rule includes the following steps.

Step e: Determine that j=1, where j is a cyclic parameter.

Step f: Determine whether the M pieces of control information include control information corresponding to control information whose priority sequence number is j, where a priority of the control information whose priority sequence number is j is higher than priorities of control information whose priority sequence number is j+1 to control information whose priority sequence number is S; and if yes, determine the control information corresponding to the control information whose priority sequence number is j as one piece of control information in condition control information.

Step g: Determine whether a quantity of pieces of the condition control information is equal to L; and if no, determine that a current value of j plus 1 is a new value of j, and return to step f; or if yes, determine the L pieces of control information based on the condition control information.

In other words, the terminal apparatus may determine the L pieces of control information in a manner of searching the M pieces of control information for high-priority control information.

In an example, the M pieces of control information include the following eight pieces of control information:

TABLE 2

Control information and priorities indicated in the priority rule

| Control information | Type | Attribute | Communication Mode | Priority |
|---|---|---|---|---|
| 1 | 1 | 1 | 1 | 2 |
| 2 | 1 | 1 | 2 | 3 |
| 3 | 1 | 2 | 1 | 4 |
| 4 | 1 | 2 | 2 | 5 |
| 5 | 2 | 1 | 1 | 6 |

TABLE 2-continued

Control information and priorities indicated in the priority rule

| Control information | Type | Attribute | Communication Mode | Priority |
|---|---|---|---|---|
| 6 | 2 | 1 | 2 | 7 |
| 7 | 2 | 2 | 1 | 8 |
| 8 | 2 | 2 | 2 | 9 |

Control information 0 whose priority is 1 is not in the M pieces of control information.

It is assumed that L is equal to 1:

Step 1: i=1, and the terminal apparatus may determine, based on the priority rule, that the M pieces of control information do not include the control information 0 whose priority is 1. In this case, the terminal apparatus cannot determine condition control information, a quantity of current condition control information is 0, and the L pieces of control information cannot be determined.

Step 2: i=2, and the terminal apparatus may determine, based on the priority rule, that the M pieces of control information include the control information 1 whose priority is 2. In this case, the terminal apparatus determines the control information 1 as condition control information, a quantity of current condition control information is 1, and the terminal apparatus can determine that the L pieces of control information are the control information 1.

Optionally, the determining L pieces of control information from M pieces of control information based on a priority rule includes: determining a priority sequence of the M pieces of control information based on the priority rule; and determining the L pieces of control information based on the priority sequence of the M pieces of control information.

In other words, the terminal apparatus may determine a priority of each of the M pieces of control information based on the priority rule, and determine the L pieces of control information with highest priorities based on the priorities of the M pieces of control information.

For example, M is equal to 3, and L is equal to 2. The terminal first determines that the M pieces of control information include control information 1, control information 2, and control information 3, and then determines, based on the priority rule, that a priority of the control information 1 is higher than a priority of the control information 2, and that the priority of the control information 2 is higher than a priority of the control information 3. In this case, the terminal determines that two pieces of control information with highest priorities in the M pieces of control information are the control information 1 and the control information 2, and determines that the control information 1 and the control information 2 are the L pieces of control information.

Optionally, specific priorities of the M pieces of control information may be determined, so as to determine the priority sequence of the M pieces of control information.

For example, M is equal to 2, L is equal to 1, and the priority rule indicates that a priority of control information 1 is 1, a priority of control information 2 is 2, and a priority of control information 3 is 3. The terminal first determines that the M pieces of control information include the control information 2 and the control information 3. Based on the priority rule, the terminal determines that the priority of the control information 2 is 2 and the priority of the control information is 3, and determines that the control information 2 is the L pieces of control information.

Optionally, the priority rule may be represented by using a priority formula.

In other words, the terminal apparatus may determine the priority sequence of the M pieces of control information based on a priority formula.

In an example, Formula (1) indicates a priority sequence of at least two types of control information. Formula (1) meets the following condition:

$$\mathrm{Pri}_{UCI+SFCI}(y,z,k)=8y+2z+k$$

Herein, y=0 represents an HARQ-ACK, an HARQ-NACK, or an SR, and y=1 represents CSI; z=0 represents a-CSI, an HARQ-ACK, an HARQ-NACK, or an SR, z=1 represents SP-CSI on a PUSCH, z=2 represents SP-CSI on a PUCCH, and z=3 represents p-CSI on a PUCCH; k=0 represents an HARQ-ACK, an HARQ-NACK, an SR, or beam related CSI, and k=1 represents non-beam related CSI.

Formula (1) meets: A priority of an HARQ-ACK, an HARQ-NACK, or an SR is higher than a priority of CSI; a priority of a-CSI is higher than a priority of SP-CSI on a PUSCH, the priority of SP-CSI on a PUSCH is higher than a priority of SP-CSI on a PUCCH, and the priority of SP-CSI on a PUCCH is higher than a priority of p-CSI on a PUCCH; and a priority of beam related CSI is higher than a priority of non-beam related CSI.

In an example, Formula (2) indicates a priority sequence of at least two types of control information corresponding to at least two attributes. Formula (2) meets the following condition:

$$\mathrm{Pri}^{UCI+SFCI}(x,y,z,k,c,s)=16N_{cells}M_s \cdot x+8N_{cells}M_s \cdot y+2N_{cells}M_s \cdot z+_{cells}M_s \cdot k+M_s \cdot c+s$$

Herein, x=0 represents an uplink attribute, and x=1 represents a sidelink attribute; y=0 represents an HARQ-ACK, an HARQ-NACK, or an SR, and y=1 represents CSI; z=0 represents a-CSI, an HARQ-ACK, an HARQ-NACK, or an SR, z=1 represents SP-CSI on a PUSCH, z=2 represents SP-CSI on a PUCCH, and z=3 represents p-CSI on a PUCCH; k=0 represents an HARQ-ACK, an HARQ-NACK, an SR, or beam related CSI, and k=1 represents non-beam related CSI; c represents a corresponding cell number, s represents a corresponding CSI configuration identifier, $M_s$ represents a total quantity of CSI configuration identifiers, and Ncens represents a total quantity of cell numbers.

Formula (2) meets: A priority of UCI is higher than a priority of sidelink control information; a priority of an HARQ-ACK, an HARQ-NACK, or an SR is higher than a priority of CSI; a priority of a-CSI is higher than a priority of SP-CSI on a PUSCH, the priority of SP-CSI on a PUSCH is higher than a priority of SP-CSI on a PUCCH, and the priority of SP-CSI on a PUCCH is higher than a priority of p-CSI on a PUCCH; a priority of beam related CSI is higher than a priority of non-beam related CSI; a priority of control information of a same type and corresponding to a cell with a smaller cell number is higher than a priority of control information of the same type and corresponding to a cell with a larger cell number; and a priority of control information corresponding to a same cell number, a same type, and a smaller CSI configuration identifier is higher than a priority of control information corresponding to the same cell number, the same type, and a larger CSI configuration identifier.

In an example, Formula (3) indicates a priority sequence of at least two types of control information corresponding to at least two communication modes and at least two attributes. Formula (3) meets the following condition:

$$\text{Pri}_{UCI+SFCI}(x,y,z,k,c,s,w) = 24N_{cells}M_s \cdot x + 12N_{cells}M_s + 6N_{cell\ s} \cdot z + 3N_{cells} \cdot k + 3M_s \cdot c + 3s + w$$

Herein, x=0 represents an uplink attribute, and x=1 represents a sidelink attribute; y=0 represents an HARQ-ACK, an HARQ-NACK, or an SR, and y=1 represents CSI; z=0 represents a-CSI, an HARQ-ACK, an HARQ-NACK, or an SR, z=1 represents SP-CSI on a PUSCH, z=2 represents SP-CSI on a PUCCH, and z=3 represents p-CSI on a PUCCH; k=0 represents an HARQ-ACK, an HARQ-NACK, an SR, or beam related CSI, and k=1 represents non-beam related CSI; c represents a corresponding cell number, s represents a corresponding CSI configuration identifier, $M_s$ represents a total quantity of CSI configuration identifiers, and $N_{cells}$ represents a total quantity of cell numbers; w=0 indicates that a corresponding sidelink communication mode is broadcast, w=1 indicates that a corresponding sidelink communication mode is multicast, and w=2 indicates that a corresponding sidelink communication mode is unicast.

Formula (3) meets: A priority of UCI is higher than a priority of sidelink control information; a priority of an HARQ-ACK, an HARQ-NACK, or an SR is higher than a priority of CSI; a priority of a-CSI is higher than a priority of SP-CSI on a PUSCH, the priority of SP-CSI on a PUSCH is higher than a priority of SP-CSI on a PUCCH, and the priority of SP-CSI on a PUCCH is higher than a priority of p-CSI on a PUCCH; a priority of beam related CSI is higher than a priority of non-beam related CSI; a priority of control information of a same type and corresponding to a cell with a smaller cell number is higher than a priority of control information of the same type and corresponding to a cell with a larger cell number; a priority of control information corresponding to a same cell number, a same type, and a smaller CSI configuration identifier is higher than a priority of control information corresponding to the same cell number, the same type, and a larger CSI configuration identifier; and for control information corresponding to a same cell number, a same CSI configuration identifier, and a same type, a priority of control information corresponding to a sidelink whose communication mode is broadcast is higher than a priority of control information corresponding to a sidelink whose communication mode is multicast, and the priority of control information corresponding to a sidelink whose communication mode is multicast is higher than a priority of control information corresponding to a sidelink whose communication mode is unicast.

Optionally, the terminal apparatus may exclude M−L pieces of control information from the M pieces of control information in a manner of searching the M pieces of control information for low-priority control information, so as to determine the L pieces of control information. A manner of determining the L pieces of control information is similar to the manner described above, and details are not described herein again.

Similarly, the communications apparatus may determine the L pieces of control information from the M pieces of control information based on the priority rule. A corresponding method is described in step 401, and details are not described herein again in this application.

The terminal apparatus sends the L pieces of control information. Correspondingly, the communications apparatus receives the L pieces of control information.

In an example, the terminal apparatus sends the M pieces of sidelink control information on sidelink resources. The terminal apparatus may determine the L pieces of sidelink control information based on the priority rule.

In an example, the terminal apparatus sends the M pieces of sidelink control information on uplink resources. The terminal apparatus may determine the L pieces of sidelink control information based on the priority rule.

In an example, the terminal apparatus sends the M1 pieces of UCI and the M2 pieces of sidelink control information on uplink resources. The terminal apparatus may determine the L pieces of control information based on the control information rule.

Optionally, that the terminal apparatus sends the L pieces of control information includes: The terminal apparatus sends the L pieces of control information on at least one of a PSFCH, a PSCCH, a PSSCH, a PUCCH, and a PUSCH.

The control information may be sent on the PSFCH, the PSCCH, the PSSCH, the PUCCH, or the PUSCH. Sidelink control information (SFCI, Sidelink feedback control information) may be sent on at least one of the PSFCH, the PSCCH, or the PSSCH. Alternatively, UCI and SFCI may be sent on the PUCCH and/or the PUSCH. Alternatively, only SFCI may be sent on the PUCCH and/or the PUSCH. For example, UCI 1 and sidelink control information 1 are sent on the PUCCH, and sidelink control information 2 is sent on the PSSCH.

Similarly, the communications apparatus may receive the L pieces of control information. A corresponding method is described in step 403, and details are not described herein again in this application.

The priority rule may indicate priorities of different pieces of control information from one or more perspectives, and provides a plurality of manners for the terminal to determine the priorities of the control information. The terminal apparatus sends control information with a relatively high priority based on the priority rule, so that the terminal apparatus does not miss control information with a high priority. The terminal may exclude low-priority control information based on the priority rule, thereby reducing energy consumption for sending messages by the terminal apparatus. A quantity of resources that can be used by the terminal is limited, and sending more important control information on a channel can improve resource utilization.

Figure 5:
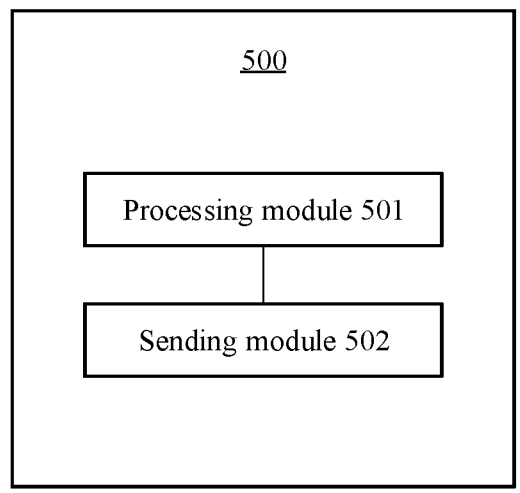
FIG. 5 is a schematic structural diagram of a transmit end apparatus according to an embodiment of this application.

FIG. 5 is a schematic structural diagram of a transmit end apparatus according to an embodiment of this application. The transmit end apparatus may be a terminal apparatus, or may be a component (for example, a chip or a circuit) that can be used for the terminal apparatus. As shown in FIG. 5, the transmit end apparatus 500 may include a processing module 501 and a sending module 502.

The processing module 501 is configured to determine L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M.

The sending module 502 is configured to send the L pieces of control information.

The processing module 501 may be implemented by a processor. The sending module 502 may be implemented by a transmitter. For specific functions and beneficial effects of the processing module 501 and the sending module 502, refer to the method shown in FIG. 4. Details are not described herein again.

In a possible embodiment, a transmit end apparatus is further provided. The transmit end apparatus may be a terminal apparatus, or may be a component (for example, a chip or a circuit) that can be used for the terminal apparatus. The transmit end apparatus may include a transceiver and a processor, and optionally, may further include a memory. The transceiver may be configured to implement corresponding functions and operations corresponding to the receiving module and the sending module, and the processor may be configured to implement a corresponding function and operation of the processing module. The memory may be configured to store execution instructions or application program code, and the processor controls execution of the instructions or application program code, to implement the communication method provided in the foregoing embodiments of this application, and/or may be configured to temporarily store some data, instruction information, and the like. The memory may exist independently of the processor. In this case, the memory may be connected to the processor through a communication line. In another possible design, the memory may alternatively be integrated with the processor. This is not limited in this embodiment of this application.

Figure 6:
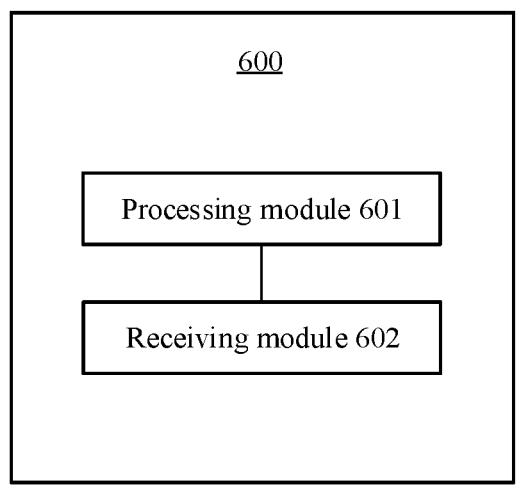
FIG. 6 is a schematic structural diagram of a receive end apparatus according to an embodiment of this application.

FIG. 6 is a schematic structural diagram of a receive end apparatus according to an embodiment of this application. The receive end apparatus may be a network apparatus, or may be a component (for example, a chip or a circuit) used for the network apparatus. The receive end apparatus may be a terminal apparatus, or may be a component (for example, a chip or a circuit) that can be used for the terminal apparatus. As shown in FIG. 6, the receive end apparatus 600 may include a processing module 601 and a receiving module 602.

The processing module 601 is configured to determine L pieces of control information from M pieces of control information based on a priority rule, where the M pieces of control information include M1 pieces of uplink control information and M2 pieces of sidelink control information, types of the M1 pieces of uplink control information include at least one of a hybrid automatic repeat request, a scheduling request, and channel state information, types of the M2 pieces of sidelink control information include at least one of a sidelink hybrid automatic repeat request, a sidelink scheduling request, and sidelink channel state information, M is a positive integer greater than or equal to 2, M1 is an integer greater than or equal to 0, M2 is a positive integer greater than or equal to 1, and L is an integer greater than or equal to 0 and less than or equal to M.

The receiving module 602 is configured to receive the L pieces of control information.

The processing module 601 may be implemented by a processor. The receiving module 602 may be implemented by a receiver. For specific functions and beneficial effects of the processing module 601 and the receiving module 602, refer to the method shown in FIG. 4. Details are not described herein again.

In a possible embodiment, a receive end apparatus is further provided. The receive end apparatus may be a network apparatus, or may be a component (for example, a chip or a circuit) used for the network apparatus. The receive end apparatus may be a terminal apparatus, or may be a component (for example, a chip or a circuit) that can be used for the terminal apparatus. The receive end apparatus may include a transceiver and a processor, and optionally, may further include a memory. The transceiver may be configured to implement corresponding functions and operations corresponding to the receiving module and the sending module, and the processor may be configured to implement a corresponding function and operation of the processing module. The memory may be configured to store execution instructions or application program code, and the processor controls execution of the instructions or application program code, to implement the communication method provided in the foregoing embodiments of this application, and/or may be configured to temporarily store some data, instruction information, and the like. The memory may exist independently of the processor. In this case, the memory may be connected to the processor through a communication line. In another possible design, the memory may alternatively be integrated with the processor. This is not limited in this embodiment of this application.

Figure 7:
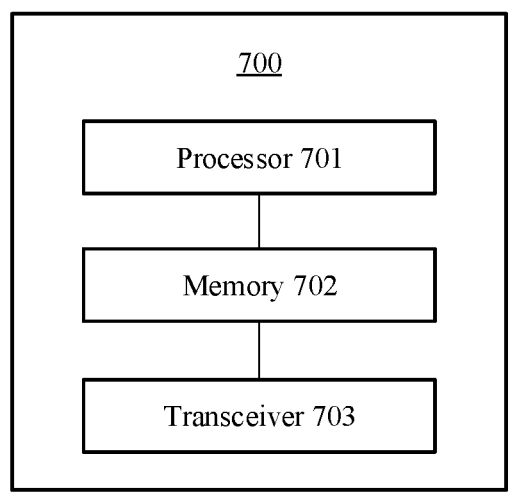
FIG. 7 is a schematic structural diagram of a terminal apparatus according to an embodiment of this application.

FIG. 7 is a structural block diagram of a terminal apparatus according to an embodiment of the present invention. As shown in FIG. 7, the terminal apparatus includes a processor 701, a memory 702, a radio frequency circuit, an antenna, and an input/output apparatus. The processor 701 may be configured to: process a communication protocol and communication data, and control the terminal apparatus to execute a software program, process data of the software program, and the like. The memory 702 is mainly configured to store a software program and data. The radio frequency circuit is mainly configured to: perform conversion between a baseband signal and a radio frequency signal, and process the radio frequency signal. The antenna is mainly configured to send/receive a radio frequency signal in a form of electromagnetic waves. The input/output apparatus, such as a touchscreen, a display screen, or a keyboard, is mainly configured to: receive data entered by a user, and output data to the user. It should be noted that some types of terminal apparatuses may have no input/output apparatus.

When data needs to be sent, the processor 701 performs baseband processing on the to-be-sent data, and outputs a baseband signal to the radio frequency circuit. After performing radio frequency processing on the baseband signal, the radio frequency circuit sends, through the antenna, the radio frequency signal in the form of electromagnetic waves. When data is to be sent to the terminal apparatus, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 7 shows only one memory and one processor. In an actual terminal apparatus product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver 703 of the terminal apparatus, and the processor that has a processing function may be considered as a processing unit of the terminal apparatus. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 703 and that is configured to implement a receiving function may be considered as a receiving unit, and a component that is in the transceiver 703 and that is configured to implement a sending function may be considered as a sending unit. In other words, the transceiver 703 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The processor 701, the memory 702, and the transceiver 703 communicate with each other through an internal connection path, to transfer a control signal and/or a data signal.

The method disclosed in the foregoing embodiments of the present invention may be applied to the processor 701, or implemented by the processor 701. The processor 701 may be an integrated circuit chip, and has a signal processing capability. In an implementation process, the steps in the foregoing methods may be implemented by using a hardware integrated logic circuit in the processor 701, or by using instructions in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory (random access memory, RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

Optionally, in some embodiments, the memory 702 may store instructions used to perform the method performed by the terminal apparatus in the method shown in FIG. 4. The processor 701 may complete, by executing the instructions stored in the memory 702 in combination with other hardware (for example, the transceiver 703), steps performed by the terminal apparatus in the method shown in FIG. 4. For a specific working process and beneficial effects, refer to the descriptions in the embodiment shown in FIG. 4.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform a method on a terminal apparatus side in the foregoing method embodiments.

An embodiment of this application further provides a computer-readable storage medium, where the computer-readable storage medium stores instructions, and when the instructions are executed, a method on a terminal apparatus side in the foregoing method embodiments is performed.

An embodiment of this application further provides a computer program product including instructions, where when the instructions are executed, a method on a terminal apparatus side in the foregoing method embodiments is performed.

Figure 8:
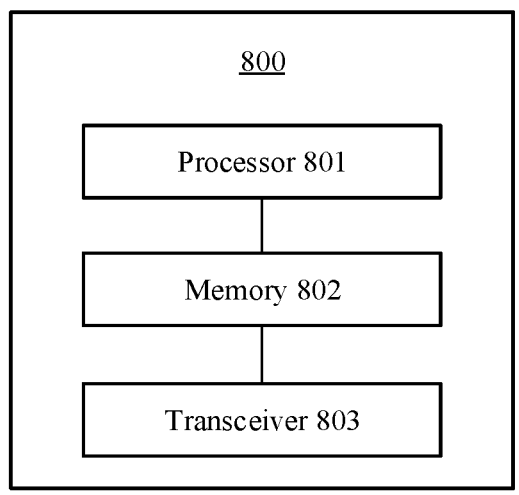
FIG. 8 is a schematic structural diagram of a network apparatus according to an embodiment of this application.

FIG. 8 is a structural block diagram of a network apparatus according to an embodiment of the present invention. The network apparatus 800 shown in FIG. 8 includes a processor 801, a memory 802, and a transceiver 803.

The processor 801, the memory 802, and the transceiver 803 communicate with each other through an internal connection path, to transfer a control and/or data signal.

The method disclosed in the foregoing embodiments of the present invention may be applied to the processor 801, or implemented by the processor 801. The processor 801 may be an integrated circuit chip, and has a signal processing capability. In an implementation process, the steps in the foregoing methods can be implemented by using a hardware integrated logic circuit in the processor 801, or by using instructions in a form of software. The foregoing processor 801 may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory 802. The processor 801 reads the instructions in the memory 802, and complete the steps in the foregoing methods in combination with hardware of the processor 801.

Optionally, in some embodiments, the memory 802 may store instructions used to perform the method performed by the communications apparatus in the method shown in FIG. 4. The processor 801 may complete, by executing the instructions stored in the memory 802 in combination with other hardware (for example, the transceiver 803), steps performed by the communications apparatus in the method shown in FIG. 4. For a specific working process and beneficial effects, refer to the descriptions in the embodiment shown in FIG. 4.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform a method on a communications apparatus side in the foregoing embodiments.

In another form of this embodiment, a computer-readable storage medium is provided. The computer-readable storage medium stores instructions. When the instructions are executed, the method on the communications apparatus side in the foregoing method embodiments is performed.

In another form of this embodiment, a computer program product that includes instructions is provided. When the instructions are executed, the method on the communications apparatus side in the foregoing method embodiments is performed.

Figure 9:
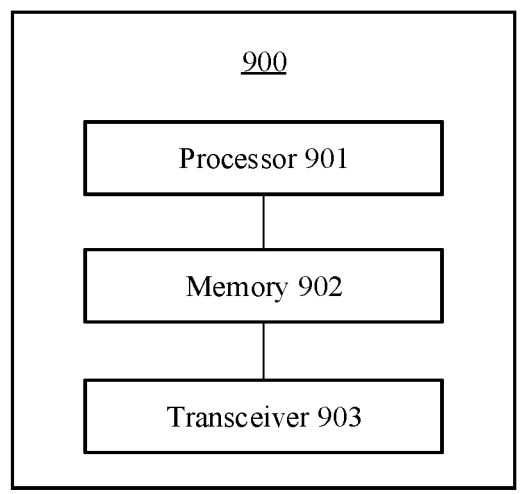
FIG. 9 is a schematic structural diagram of a terminal apparatus according to an embodiment of this application.

FIG. 9 is a structural block diagram of a terminal apparatus according to an embodiment of the present invention. As shown in FIG. 9, the terminal apparatus includes a processor 901, a memory 902, a radio frequency circuit, an antenna, and an input/output apparatus. The processor 901 may be configured to: process a communication protocol and communication data, and control the terminal apparatus to execute a software program, process data of the software program, and the like. The memory 902 is mainly configured to store a software program and data. The radio frequency circuit is mainly configured to: perform conversion between a baseband signal and a radio frequency signal, and process the radio frequency signal. The antenna is mainly configured to send/receive a radio frequency signal in a form of electromagnetic waves. The input/output apparatus, such as a touchscreen, a display screen, or a keyboard, is mainly configured to: receive data entered by a user, and output data to the user. It should be noted that some types of terminal apparatuses may have no input/output apparatus.

When data needs to be sent, the processor 901 performs baseband processing on the to-be-sent data, and outputs a baseband signal to the radio frequency circuit. After performing radio frequency processing on the baseband signal, the radio frequency circuit sends, through the antenna, the radio frequency signal in the form of electromagnetic waves. When data is to be sent to the terminal apparatus, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal apparatus product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver 903 of the terminal apparatus, and the processor that has a processing function may be considered as a processing unit of the terminal apparatus. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 903 and that is configured to implement a receiving function may be considered as a receiving unit, and a component that is in the transceiver 903 and that is configured to implement a sending function may be considered as a sending unit. In other words, the transceiver 903 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The processor 901, the memory 902, and the transceiver 903 communicate with each other through an internal connection path, to transfer a control and/or data signal.

The method disclosed in the foregoing embodiments of the present invention may be applied to the processor 901, or implemented by the processor 901. The processor 901 may be an integrated circuit chip and has a signal processing capability. In an implementation process, steps in the foregoing methods can be implemented by a hardware integrated logical circuit in the processor 901, or by instructions in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

Optionally, in some embodiments, the memory 902 may store instructions used to perform the method performed by the communications apparatus in the method shown in FIG. 4. The processor 901 may complete, by executing the instructions stored in the memory 902 in combination with other hardware (for example, the transceiver 903), steps performed by the communications apparatus in the method shown in FIG. 4. For a specific working process and beneficial effects, refer to the descriptions in the embodiment shown in FIG. 4.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform a method on a communications apparatus side in the foregoing method embodiments.

An embodiment of this application further provides a computer-readable storage medium, where the computer-readable storage medium stores instructions, and when the instructions are executed, a method on a communications apparatus side in the foregoing method embodiments is performed.

An embodiment of this application further provides a computer program product including instructions, where when the instructions are executed, a method on a communications apparatus side in the foregoing method embodiments is performed.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control information sending method, comprising:
    determining, by a terminal apparatus, L pieces of control information from M pieces of control information based on a priority rule, wherein a total quantity of bits of the M pieces of control information is greater than a channel capacity of the terminal apparatus, wherein the M pieces of control information comprise M1 pieces of uplink control information and M2 pieces of sidelink control information, wherein types of the M1 pieces of uplink control information comprise at least one of a hybrid automatic repeat request, a scheduling request, and channel state information, wherein types of the M2 pieces of sidelink control information comprise at least one of a sidelink hybrid automatic repeat request, a sidelink scheduling request, and sidelink channel state information, and wherein M is a positive integer greater than or equal to 2, M1 is an integer greater than or equal to 0, M2 is a positive integer greater than or equal to 1, and L is an integer greater than or equal to 0 and less than or equal to M; and
    sending, by the terminal apparatus, the L pieces of control information;
    wherein determining the L pieces of control information from the M pieces of control information based on the priority rule comprises:
    determining the L pieces of control information from the M pieces of control information based on the priority rule and the channel capacity, wherein a total quantity of bits of the L pieces of control information is less than or equal to the channel capacity.

2. The method according to claim 1, wherein the priority rule comprises at least one of a priority rule for at least two types of control information, a priority rule for control information corresponding to at least two communication modes, and a priority rule for control information corresponding to at least two attributes.

3. The method according to claim 2, wherein the priority rule for the at least two types of control information comprises at least one of the following priority rules:
    a priority of a sidelink hybrid automatic repeat request being higher than a priority of sidelink channel state information;
    a priority of a sidelink scheduling request being higher than a priority of sidelink channel state information;
    a priority of sidelink aperiodic channel state information being higher than a priority of sidelink semi-persistent channel state information;
    a priority of sidelink aperiodic channel state information being higher than a priority of sidelink periodic channel state information;
    a priority of sidelink semi-persistent channel state information being higher than a priority of sidelink periodic channel state information;
    a priority of sidelink beam related channel state information being higher than a priority of sidelink non-beam related channel state information;
    a priority of sidelink rank related channel state information being higher than a priority of sidelink non-rank related channel state information;
    a priority of sidelink wideband channel state information being higher than a priority of sidelink sub-band channel state information; and
    a priority of uplink control information being higher than a priority of sidelink control information.

4. The method according to claim 3, wherein the priority of uplink control information higher than the priority of sidelink control information comprises at least one of the following priority rules:
- a priority of a hybrid automatic repeat request being higher than a priority of a sidelink hybrid automatic repeat request;
- a priority of a scheduling request being higher than a priority of a sidelink scheduling request;
- a priority of channel state information being higher than a priority of sidelink channel state information;
- a priority of aperiodic channel state information being higher than a priority of sidelink aperiodic channel state information;
- a priority of semi-persistent channel state information being higher than a priority of sidelink semi-persistent channel state information;
- a priority of periodic channel state information being higher than a priority of sidelink periodic channel state information;
- a priority of beam related channel state information being higher than a priority of sidelink beam related channel state information;
- a priority of non-beam related channel state information being higher than a priority of sidelink non-beam related channel state information;
- a priority of rank related channel state information being higher than a priority of sidelink rank related channel state information;
- a priority of non-rank related channel state information being higher than a priority of sidelink non-rank related channel state information;
- a priority of wideband channel state information being higher than a priority of sidelink wideband channel state information; and
- a priority of sub-band channel state information being higher than a priority of sidelink sub-band channel state information.

5. The method according to claim 2, wherein the priority rule for the control information corresponding to the at least two communication modes comprises at least one of the following priority rules:
- a priority of sidelink feedback information corresponding to a sidelink whose communication mode is broadcast being higher than a priority of sidelink feedback information corresponding to a sidelink whose communication mode is multicast;
- a priority of sidelink feedback information corresponding to a sidelink whose communication mode is broadcast being higher than a priority of sidelink feedback information corresponding to a sidelink whose communication mode is unicast; and
- a priority of sidelink feedback information corresponding to a sidelink whose communication mode is multicast being higher than a priority of sidelink feedback information corresponding to a sidelink whose communication mode is unicast.

6. The method according to claim 2, wherein the priority rule for the control information corresponding to the at least two attributes comprises at least one of the following priority rules:
- a priority of sidelink feedback information corresponding to a cell with a smaller cell number being higher than a priority of sidelink feedback information corresponding to a cell with a larger cell number;
- a priority of sidelink feedback information corresponding to a smaller channel state information configuration identifier being higher than a priority of sidelink feedback information corresponding to a larger channel state information configuration identifier; and
- a priority of control information corresponding to a smaller sending link number being higher than a priority of control information corresponding to a larger sending link number.

7. A terminal apparatus, comprising:
at least one processor; and
one or more memories coupled to the at least one processor and storing programming instructions for execution by the at least one processor to:
- determine L pieces of control information from M pieces of control information based on a priority rule, wherein a total quantity of bits of the M pieces of control information is greater than a channel capacity of the terminal apparatus, wherein the M pieces of control information comprise M1 pieces of uplink control information and M2 pieces of sidelink control information, and wherein types of the M1 pieces of uplink control information comprise at least one of a hybrid automatic repeat request, a scheduling request, and channel state information, and wherein types of the M2 pieces of sidelink control information comprise at least one of a sidelink hybrid automatic repeat request, a sidelink scheduling request, and sidelink channel state information, and wherein M is a positive integer greater than or equal to 2, M1 is an integer greater than or equal to 0, M2 is a positive integer greater than or equal to 1, and L is an integer greater than or equal to 0 and less than or equal to M; and
- send the L pieces of control information;
wherein determining the L pieces of control information from the M pieces of control information based on the priority rule comprises:
- determining the L pieces of control information from the M pieces of control information based on the priority rule and the channel capacity, wherein a total quantity of bits of the L pieces of control information is less than or equal to the channel capacity.

8. The terminal apparatus according to claim 7, wherein the priority rule determines at least one of a priority rule for at least two types of control information, a priority rule for control information corresponding to at least two communication modes, and a priority rule for control information corresponding to at least two attributes.

9. The terminal apparatus according to claim 8, wherein the priority rule for the at least two types of control information comprises at least one of the following:
- a priority of a sidelink hybrid automatic repeat request being higher than a priority of sidelink channel state information;
- a priority of a sidelink scheduling request being higher than a priority of sidelink channel state information;
- a priority of sidelink aperiodic channel state information being higher than a priority of sidelink semi-persistent channel state information;
- a priority of sidelink aperiodic channel state information being higher than a priority of sidelink periodic channel state information;
- a priority of sidelink semi-persistent channel state information being higher than a priority of sidelink periodic channel state information;

a priority of sidelink beam related channel state information being higher than a priority of sidelink non-beam related channel state information;

a priority of sidelink rank related channel state information being higher than a priority of sidelink non-rank related channel state information;

a priority of sidelink wideband channel state information being higher than a priority of sidelink sub-band channel state information; and a priority of uplink control information being higher than a priority of sidelink control information.

10. The terminal apparatus according to claim 9, wherein the priority of uplink control information higher than the priority of sidelink control information comprises at least one of the following priority rules:

a priority of a hybrid automatic repeat request being higher than a priority of a sidelink hybrid automatic repeat request;

a priority of a scheduling request being higher than a priority of a sidelink scheduling request;

a priority of channel state information being higher than a priority of sidelink channel state information;

a priority of aperiodic channel state information being higher than a priority of sidelink aperiodic channel state information;

a priority of semi-persistent channel state information being higher than a priority of sidelink semi-persistent channel state information;

a priority of periodic channel state information being higher than a priority of sidelink periodic channel state information;

a priority of beam related channel state information being higher than a priority of sidelink beam related channel state information;

a priority of non-beam related channel state information being higher than a priority of sidelink non-beam related channel state information;

a priority of rank related channel state information being higher than a priority of sidelink rank related channel state information;

a priority of non-rank related channel state information being higher than a priority of sidelink non-rank related channel state information;

a priority of wideband channel state information being higher than a priority of sidelink wideband channel state information; and a priority of sub-band channel state information being higher than a priority of sidelink sub-band channel state information.

11. The terminal apparatus according to claim 8, wherein the priority rule for the control information corresponding to the at least two communication modes comprises at least one of the following priority rules:

a priority of sidelink feedback information corresponding to a sidelink whose communication mode is broadcast being higher than a priority of sidelink feedback information corresponding to a sidelink whose communication mode is multicast;

a priority of sidelink feedback information corresponding to a sidelink whose communication mode is broadcast being higher than a priority of sidelink feedback information corresponding to a sidelink whose communication mode is unicast; and a priority of sidelink feedback information corresponding to a sidelink whose communication mode is multicast being higher than a priority of sidelink feedback information corresponding to a sidelink whose communication mode is unicast.

12. The terminal apparatus according to claim 8, wherein the priority rule for the control information corresponding to the at least two attributes comprises at least one of the following priority rules:

a priority of sidelink feedback information corresponding to a cell with a smaller cell number being higher than a priority of sidelink feedback information corresponding to a cell with a larger cell number;

a priority of sidelink feedback information corresponding to a smaller channel state information configuration identifier being higher than a priority of sidelink feedback information corresponding to a larger channel state information configuration identifier; and a priority of control information corresponding to a smaller sending link number being higher than a priority of control information corresponding to a larger sending link number.

13. A non-transitory, computer-readable medium, wherein the computer-readable medium stores program code, and when the program code is run on a computer, the computer is enabled to:

determine L pieces of control information from M pieces of control information based on a priority rule, wherein a total quantity of bits of the M pieces of control information is greater than a channel capacity of the computer, wherein the M pieces of control information comprise M1 pieces of uplink control information and M2 pieces of sidelink control information, and wherein types of the M1 pieces of uplink control information comprise at least one of a hybrid automatic repeat request, a scheduling request, and channel state information, and wherein types of the M2 pieces of sidelink control information comprise at least one of a sidelink hybrid automatic repeat request, a sidelink scheduling request, and sidelink channel state information, and wherein M is a positive integer greater than or equal to 2, M1 is an integer greater than or equal to 0, M2 is a positive integer greater than or equal to 1, and L is an integer greater than or equal to 0 and less than or equal to M; and send the L pieces of control information;

wherein determining the L pieces of control information from the M pieces of control information based on the priority rule comprises:

determining the L pieces of control information from the M pieces of control information based on the priority rule and the channel capacity, wherein a total quantity of bits of the L pieces of control information is less than or equal to the channel capacity.

14. The medium according to claim 13, wherein the priority rule comprises at least one of a priority rule for at least two types of control information, a priority rule for control information corresponding to at least two communication modes, and a priority rule for control information corresponding to at least two attributes.

15. The medium according to claim 14, wherein the priority rule for the at least two types of control information comprises at least one of the following priority rules:

a priority of a sidelink hybrid automatic repeat request being higher than a priority of sidelink channel state information;

a priority of a sidelink scheduling request being higher than a priority of sidelink channel state information;

a priority of sidelink aperiodic channel state information being higher than a priority of sidelink semi-persistent channel state information;

a priority of sidelink aperiodic channel state information being higher than a priority of sidelink periodic channel state information;

a priority of sidelink semi-persistent channel state information being higher than a priority of sidelink periodic channel state information;

a priority of sidelink beam related channel state information being higher than a priority of sidelink non-beam related channel state information;

a priority of sidelink rank related channel state information being higher than a priority of sidelink non-rank related channel state information;

a priority of sidelink wideband channel state information being higher than a priority of sidelink sub-band channel state information; and a priority of uplink control information being higher than a priority of sidelink control information.

16. The medium according to claim 15, wherein the priority of uplink control information higher than the priority of sidelink control information comprises at least one of the following priority rules:

a priority of a hybrid automatic repeat request being higher than a priority of a sidelink hybrid automatic repeat request;

a priority of a scheduling request being higher than a priority of a sidelink scheduling request;

a priority of channel state information being higher than a priority of sidelink channel state information;

a priority of aperiodic channel state information being higher than a priority of sidelink aperiodic channel state information;

a priority of semi-persistent channel state information being higher than a priority of sidelink semi-persistent channel state information;

a priority of periodic channel state information being higher than a priority of sidelink periodic channel state information;

a priority of beam related channel state information being higher than a priority of sidelink beam related channel state information;

a priority of non-beam related channel state information being higher than a priority of sidelink non-beam related channel state information;

a priority of rank related channel state information being higher than a priority of sidelink rank related channel state information;

a priority of non-rank related channel state information being higher than a priority of sidelink non-rank related channel state information;

a priority of wideband channel state information being higher than a priority of sidelink wideband channel state information; and a priority of sub-band channel state information being higher than a priority of sidelink sub-band channel state information.

17. The medium according to claim 14, wherein the priority rule for the control information corresponding to the at least two communication modes comprises at least one of the following priority rules:

a priority of sidelink feedback information corresponding to a sidelink whose communication mode is broadcast being higher than a priority of sidelink feedback information corresponding to a sidelink whose communication mode is multicast;

a priority of sidelink feedback information corresponding to a sidelink whose communication mode is broadcast being higher than a priority of sidelink feedback information corresponding to a sidelink whose communication mode is unicast; and a priority of sidelink feedback information corresponding to a sidelink whose communication mode is multicast being higher than a priority of sidelink feedback information corresponding to a sidelink whose communication mode is unicast.

18. The medium according to claim 14, wherein the priority rule for the control information corresponding to the at least two attributes comprises at least one of the following priority rules:

a priority of sidelink feedback information corresponding to a cell with a smaller cell number being higher than a priority of sidelink feedback information corresponding to a cell with a larger cell number;

a priority of sidelink feedback information corresponding to a smaller channel state information configuration identifier being higher than a priority of sidelink feedback information corresponding to a larger channel state information configuration identifier; and a priority of control information corresponding to a smaller sending link number being higher than a priority of control information corresponding to a larger sending link number.

* * * * *